US012525721B2

(12) United States Patent
Han et al.

(10) Patent No.: US 12,525,721 B2
(45) Date of Patent: Jan. 13, 2026

(54) ANTENNA DEVICE COMPRISING A SLOT OPENING

(71) Applicant: QUALCOMM Incorporated, San Diego, CA (US)

(72) Inventors: Jeahyeong Han, San Diego, CA (US); Sang-June Park, San Diego, CA (US); Sanjaya Kumar Khatua, Hyderabad (IN); Darryl Sheldon Jessie, Star, ID (US); Rajneesh Kumar, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 214 days.

(21) Appl. No.: 18/460,480

(22) Filed: Sep. 1, 2023

(65) Prior Publication Data

US 2025/0079716 A1 Mar. 6, 2025

(51) Int. Cl.

*H01Q 13/10* (2006.01)
*H01Q 1/38* (2006.01)
*H01Q 21/06* (2006.01)

(52) U.S. Cl.

CPC ............... *H01Q 13/10* (2013.01); *H01Q 1/38* (2013.01); *H01Q 21/061* (2013.01)

(58) Field of Classification Search

CPC ........ H01Q 13/10; H01Q 1/38; H01Q 21/061; H01Q 1/523; H01Q 9/0421; H01Q 13/106; H01Q 21/064; H01Q 1/2283

See application file for complete search history.

(56) References Cited

U.S. PATENT DOCUMENTS

| | | | | |
|---|---|---|---|---|
| 5,202,697 | A * | 4/1993 | Bonebright | H01Q 3/24 343/768 |
| 10,236,569 | B2 * | 3/2019 | Mukai | H01Q 9/0485 |
| 11,495,873 | B2 * | 11/2022 | Han | H01Q 1/36 |
| 12,244,081 | B2 * | 3/2025 | Khatua | H01Q 13/18 |
| 2017/0317418 | A1 | 11/2017 | Garcia et al. | |
| 2019/0027804 | A1 | 1/2019 | Kim et al. | |
| 2019/0089069 | A1 | 3/2019 | Niroo et al. | |
| 2021/0280959 | A1 | 9/2021 | Han et al. | |
| 2021/0359424 | A1 * | 11/2021 | Hiramatsu | H01Q 21/0006 |

OTHER PUBLICATIONS

International Search Report and Written Opinion—PCT/US2024/042711—ISA/EPO—Nov. 25, 2024.

Singh A.K., et al., "Compact Self-Quadruplexing Antenna Based on SIW Cavity-Backed with Enhanced Isolation", Progress in Electromagnetics Research C, vol. 110, Mar. 9, 2021, pp. 243-252, XP093101547, abstract, figure 1, p. 243-p. 251.

* cited by examiner

*Primary Examiner* — Seung H Lee

(74) *Attorney, Agent, or Firm* — Loza & Loza, LLP

(57) ABSTRACT

A package comprising a substrate, an integrated device coupled to a first surface of the substrate through at least a first plurality of solder interconnects; and an antenna device coupled to a second surface of the substrate through at least a second plurality of solder interconnects. The antenna device comprises an antenna device dielectric layer; at least one antenna located on a first surface of the antenna device dielectric layer; a shield located on at least one lateral surface of the antenna device; and a slot opening on the first surface of the antenna device.

30 Claims, 28 Drawing Sheets

AA CROSS SECTIONAL PROFILE VIEW

CROSS SECTIONAL PROFILE VIEW

ANGLED VIEW

ANGLED VIEW

AA CROSS SECTIONAL PROFILE VIEW

CC CROSS SECTIONAL PROFILE VIEW

CC CROSS SECTIONAL PROFILE VIEW

TOP PLAN VIEW

BOTTOM PLAN VIEW

BOTTOM VIEW

TOP VIEW

1200

CROSS SECTIONAL PROFILE VIEW

CROSS SECTIONAL PROFILE VIEW

PLAN VIEW

CROSS SECTIONAL PROFILE VIEW

CROSS SECTIONAL PROFILE VIEW

PLAN VIEW

PLAN VIEW

CROSS SECTIONAL PROFILE VIEW

PLAN VIEW

PLAN VIEW

ANTENNA DEVICE COMPRISING A SLOT OPENING

FIELD

Various features relate to packages and substrates.

BACKGROUND

Packages can include a substrate, an integrated device and an antenna. Antennas help provide wireless connectively to/from devices. However, as devices get smaller and smaller, the components in these devices also need to get smaller in order to fit in these smaller devices. There is an ongoing need to provide antennas with improved form factors, while also maintaining and/or improving the performances of the antennas, which can lead to improved performances for the devices and/or the packages.

SUMMARY

Various features relate to packages and substrates.

One example provides a package comprising a substrate, an integrated device coupled to a first surface of the substrate through at least a first plurality of solder interconnects; and an antenna device coupled to a second surface of the substrate through at least a second plurality of solder interconnects. The antenna device comprises an antenna device dielectric layer; at least one antenna located on a first surface of the antenna device dielectric layer; a shield located on at least one lateral surface of the antenna device; and a slot opening on the first surface of the antenna device.

Another example provides an antenna device comprising an antenna device dielectric layer; at least one antenna located on a first surface of the antenna device dielectric layer; a shield located on at least one lateral surface of the antenna device; and a slot opening on the first surface of the antenna device.

Another example provides a substrate comprising at least one dielectric layer; a plurality of interconnects; a first antenna device located at least partially in the at least one dielectric layer, the first antenna device comprising: a first antenna device dielectric layer; at least one first antenna located on a first surface of the first antenna device dielectric layer; a first slot opening on the first surface of the first antenna device, and a second antenna device located at least partially in the at least one dielectric layer, the second antenna device comprising: a second antenna device dielectric layer; at least one second antenna located on a first surface of the second antenna device dielectric layer; a second slot opening on the first surface of the second antenna device.

Another example provides a package comprising an integrated device; and a first substrate coupled to the integrated device through at least a first plurality of solder interconnects. The first substrate comprises at least one dielectric layer; a plurality of interconnects; a first antenna device located at least partially in the at least one dielectric layer, and a second antenna device located at least partially in the at least one dielectric layer. The first antenna device comprises a first antenna device dielectric layer; at least one first antenna located on a first surface of the first antenna device dielectric layer; and a first slot opening on the first surface of the first antenna device. The second antenna device comprises a second antenna device dielectric layer; at least one second antenna located on a first surface of the second antenna device dielectric layer; and a second slot opening on the first surface of the second antenna device.

BRIEF DESCRIPTION OF THE DRAWINGS

Various features, nature and advantages may become apparent from the detailed description set forth below when taken in conjunction with the drawings in which like reference characters identify correspondingly throughout.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The present disclosure describes a package comprising a substrate, an integrated device and an antenna device. The integrated device is coupled to a first surface of the substrate through at least a first plurality of solder interconnects. The antenna device is coupled to a second surface of the substrate through at least a second plurality of solder interconnects. The antenna device comprises an antenna device dielectric layer; at least one antenna located on a first surface of the antenna device dielectric layer; a shield located on at least one lateral surface of the antenna device; and a slot opening on the first surface of the antenna device. The slot opening may help provide enough space and isolation between antennas so as to provide improved performance in the transmission and/or reception of signals by the antennas in the antenna devices. The shield provides an enclosure that helps reduce electromagnetic interference on signals that may travel inside of the antenna device.

Exemplary Package With an Antenna Device Comprising a Slot Opening

Figure 1:
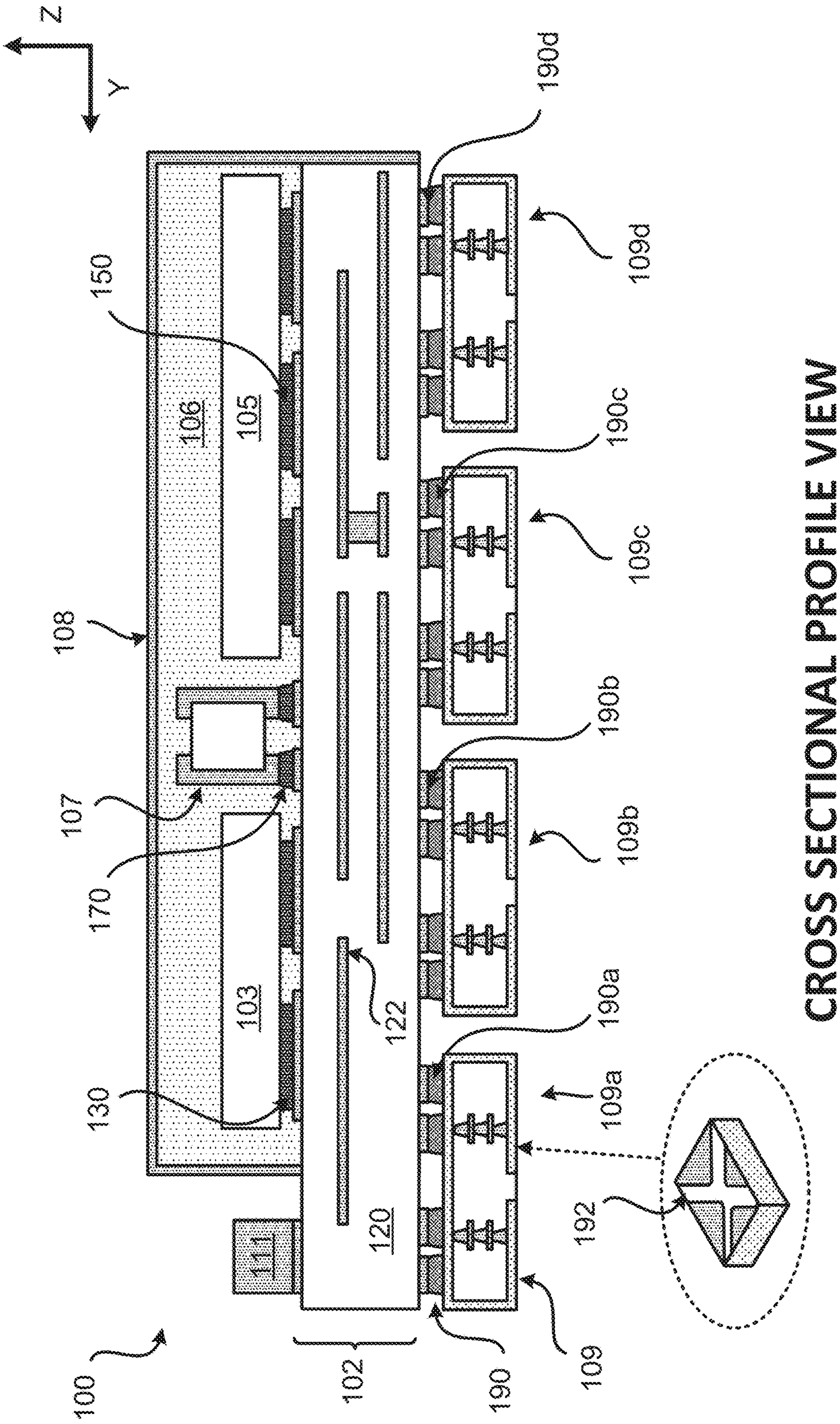
FIG. 1 illustrates an exemplary profile view of an antenna package that includes an antenna device comprising a slot opening.

FIG. 1 illustrates a profile view of a package 100 that includes an antenna device with a slot opening. The package 100 may be an antenna package. The package 100 includes a substrate 102, an integrated device 103, an integrated device 105, a passive device 107, an encapsulation layer 106, a shield 108, a plurality of antenna devices 109 and a connector 111. One or more antenna devices from the plurality of antenna devices 109, may include a slot opening.

The substrate 102 includes at least one dielectric layer 120 (e.g., substrate dielectric layer) and a plurality of interconnects 122 (e.g., substrate interconnects). The integrated device 103 is coupled to a first surface of the substrate 102 through at least a plurality of solder interconnects 130. The plurality of solder interconnects 130 may be coupled to the integrated device 103 and interconnects from the plurality of interconnects 122. The integrated device 105 is coupled to the first surface of the substrate 102 through at least a plurality of solder interconnects 150. The plurality of solder interconnects 150 may be coupled to the integrated device 105 and interconnects from the plurality of interconnects 122. The passive device 107 is coupled to the first surface of the substrate 102 through at least a plurality of solder interconnects 170. The plurality of solder interconnects 170 may be coupled to the passive device 107 and interconnects from the plurality of interconnects 122. The encapsulation layer 106 is coupled to the first surface of the substrate 102. The encapsulation layer 106 may encapsulate the integrated device 103, the integrated device 105, the passive device 107, the plurality of solder interconnects 130, the plurality of solder interconnects 150 and/or the plurality of solder interconnects 170. The encapsulation layer 106 may include a mold, a resin and/or an epoxy. The shield 108 may be coupled to an outer surface of the encapsulation layer 106. The shield 108 may also be coupled to a side portion and/or side wall of the substrate 102. The shield 108 may be configured as an electromagnetic interference (EMI) shield for the integrated device 103 and/or the integrated device 105. The shield 108 may include one or more metal layers that are coupled to and touching a surface of the encapsulation layer 106. The one or more metal layers may also be coupled to and touching a side surface of the substrate 102. The one or more metal layers of the shield 108 may be touching the at least one dielectric layer 120 of the substrate 102.

The connector 111 is coupled to the first surface of the substrate 102. Part of the connector 111 may be embedded in the substrate 102. The connector 111 may be configured to provide electrical paths for millimeter wave signals. The connector 111 may include interconnects configured as coaxial interconnects. The connector 111 may include a plurality of pins (not shown). The plurality of pins may be configured to provide electrical paths for power, ground and signals (e.g., millimeter wave signals). The connector 111 may be configured to be electrically coupled to the integrated device 103, the integrated device 105 and/or the plurality of antenna devices 109, through the substrate 102. A cable (not shown) may be coupled to the connector 111. The cable (not show) may be configured to be coupled to a board (e.g., printed circuit board).

The plurality of antenna devices 109 include an antenna device **109*a*, an antenna device 109*b*, an antenna device 109*c* and an antenna device 109*d*. The plurality of antenna devices 109 may be coupled to a second surface of the substrate 102 through a plurality of solder interconnects 190. The plurality of solder interconnects 190 include a plurality of solder interconnects 190*a*, a plurality of solder interconnects 190*b*, a plurality of solder interconnects 190*c* and a plurality of solder interconnects 190*d***.

The antenna device **109*a* is coupled to a second surface of the substrate 102 through the plurality of solder interconnects 190*a*. The plurality of solder interconnects 190*a* is coupled to the antenna device 109*a* and interconnects from the plurality of interconnects 122 of the substrate 102. The antenna device 109*b* is coupled to a second surface of the substrate 102 through the plurality of solder interconnects 190*b*. The plurality of solder interconnects 190*b* is coupled to the antenna device 109*b* and interconnects from the plurality of interconnects 122 of the substrate 102. The antenna device 109*c* is coupled to a second surface of the substrate 102 through the plurality of solder interconnects 190*c*. The plurality of solder interconnects 190*c* is coupled to the antenna device 109*c* and interconnects from the plurality of interconnects 122 of the substrate 102. The antenna device 109*d* is coupled to a second surface of the substrate 102 through the plurality of solder interconnects 190*d*. The plurality of solder interconnects 190*d* is coupled to the antenna device 109*d* and interconnects from the plurality of interconnects 122 of the substrate 102**.

As will be further described below, one of more antenna devices from the plurality of antenna devices 109 will include a slot opening. For example, the antenna device **109*a* includes a slot opening 192. A slot opening may have different shapes. For example, the slot opening 192 may have an X shape and/or an approximate X shape. A slot opening in an antenna device may be part of the antenna device where a surface of the dielectric layer is not covered by a metal layer. In this example the slot opening 192 exposes part of a surface of the dielectric layer of the antenna device 109***a*. The antenna device 109*a* may include several sides and/or surfaces. The antenna device 109*a* includes a substrate side and/or a substrate surface, that faces the substrate 102, when the antenna device 109*a* is coupled to the substrate 102. All other sides and/or surfaces of the antenna device 109*a* may be covered (e.g., entirely covered, partially covered) by a metal layer and/or metal portion. The antenna device 109*a* includes an antenna side and/or an antenna surface that is opposite to the substrate side and/or the substrate surface. The antenna side and/or the antenna surface is partially covered by a metal layer. The antenna side and/or the antenna surface of the antenna device 109*a* includes a slot opening that is not covered by a metal layer. The slot opening 192 on the antenna side and/or antenna surface has an X shape and/or an approximate X shape. However, different slot openings may have different shapes.

As will be further described below, each antenna device (e.g., 109*a*, 109*b*, 109*c*, 109*d*) may be configured to transmit and/or receive signals at different frequencies and/or different ranges of frequencies. In some implementations, each antenna device may include several antennas that are each configured to transmit and/or receive signals at different frequencies and/or different ranges of frequencies.

Figure 2:
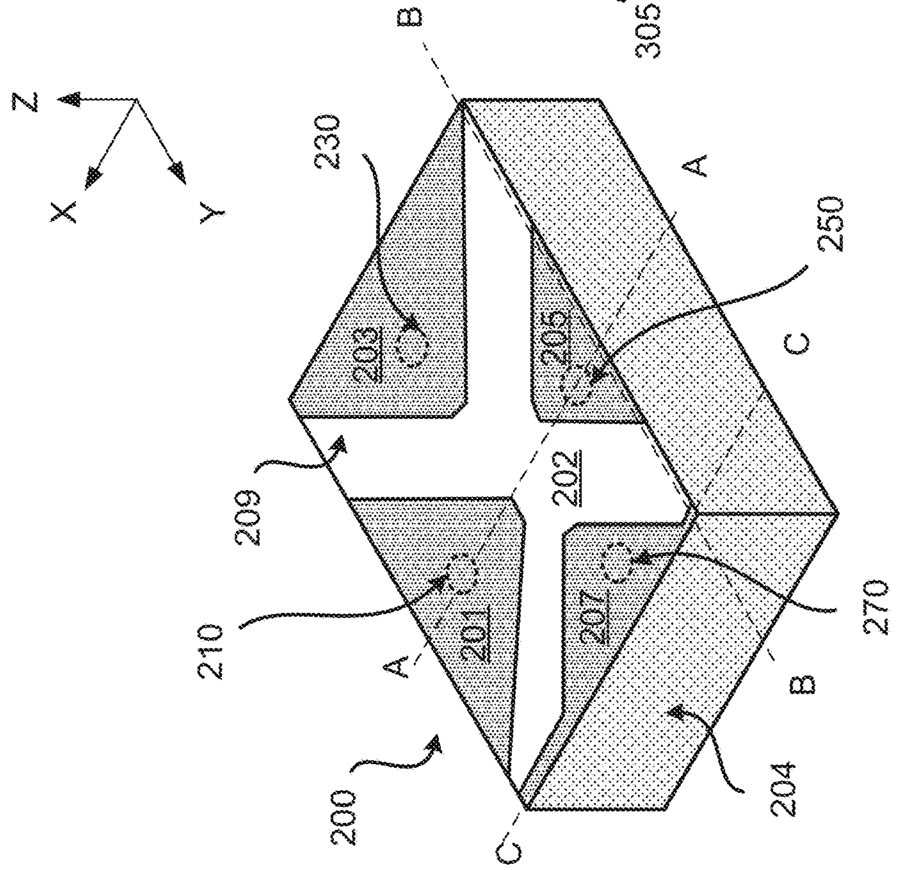
FIG. 2 illustrates an exemplary view of an antenna device comprising a slot opening.

FIG. 2 illustrates an angled view of an antenna device 200. The antenna device 200 may represent any of the antenna devices from the disclosure, such as for example, the antenna device 109*a*. The antenna device 200 includes an antenna 201, an antenna 203, an antenna 205, an antenna 207, a dielectric layer 202 (e.g., at least one dielectric layer), and a shield 204. The shield 204 may be an antenna shield. The antenna 201, the antenna 203, the antenna 205, and the antenna 207, are each made of at least one metal layer. The antenna 201, the antenna 203, the antenna 205, and the antenna 207 may be located on a same surface of the antenna device 200. The antenna 201, the antenna 203, the antenna 205, and/or the antenna 207, are located over a surface of the dielectric layer 202 (e.g., antenna device dielectric layer). The antenna 201, the antenna 203, the antenna 205, and/or the antenna 207, may have a triangular planar shape or an approximate triangular planar shape. The use of the term “triangular planar shape” shall mean to include “approximate triangular planar shape”. Thus, for example, an antenna may have more than 3 sides and/or 3 corners, but may still be considered to have a triangular planar shape if the planar shape of the antenna approximates and/or resembles the shape of a triangle. However, the antenna 201, the antenna 203, the antenna 205 and/or the antenna 207 may have different shapes and/or sizes. Moreover, different implementations of the antenna device 200 may have a different number of antennas. Thus, the antenna device 200 may have 1 or more antennas (e.g., less than 4 antennas, more than 4 antennas).

The antenna 201, the antenna 203, the antenna 205 and/or the antenna 207 are located on a surface (e.g., top surface) of the antenna device 200 in such a way that part of a surface of the dielectric layer 202 is not covered by a metal layer and/or touched by a metal layer. In some implementations, the continuous and/or contiguous portion of a surface of the dielectric layer 202 that is not covered by the antenna 201, the antenna 203, the antenna 205 and the antenna 207 may define a slot opening 209 of the antenna device 200. The slot opening (e.g., 209) of an antenna device may be defined by a portion of the antenna device that is located laterally between the antenna 201, the antenna 203, the antenna 207 and/or the antenna 207. The slot opening 209 may have an X shape or an approximate X shape. The use of the term “X shape” shall mean to include “approximate X shape”. It is noted that the slot opening 209 may have different shapes, may be non-continuous and/or non-contiguous. The slot opening 209 may be defined by areas of the surface of the dielectric layer 202 that are not covered by the antennas of the antenna device 200. The dielectric layer 202 may be an antenna device dielectric layer. In some implementations, the slot opening 209, the antenna 201, the antenna 203, the antenna 205 and/or the antenna 207 may be covered by a solder resist layer (not shown), but may still be considered to have the slot opening 209. Thus, a slot opening may still be considered to be an opening even if it is occupied by another material that is not metal. Any of the antenna 201, the antenna 203, the antenna 205, and/or the antenna 207 may be considered to be a first antenna, a second antenna, a third antenna and/or a fourth antenna.

The antenna 201 may be configured to transmit and/or receive signals at a first frequency and/or a first range of frequencies. The antenna 203 may be configured to transmit and/or receive signals at a second frequency and/or a second range of frequencies. The antenna 205 may be configured to transmit and/or receive signals at a third frequency and/or a third range of frequencies. The antenna 207 may be configured to transmit and/or receive signals at a fourth frequency and/or a fourth range of frequencies. In some implementations, the first frequency, the second frequency, the third frequency, and/or the fourth frequency may be different frequencies. In some implementations, the first range of frequencies, the second range of frequencies, the third range of frequencies, and/or the fourth range of frequencies may be different ranges of frequencies. In some embodiments, different range of frequencies may have overlapping frequencies.

The shapes, the sizes, the locations, the positions, and/or the configurations of the antenna 201, the antenna 203, the antenna 205 and/or the antenna 207, help ensure minimal interference between antennas, and may provide improved performance in the transmission and/or reception of signals by the antenna 201, the antenna 203, the antenna 205 and/or the antenna 207. The slot opening 209 may help provide enough space and isolation between antennas so as to provide improved performance in the transmission and/or reception of signals by the antenna 201, the antenna 203, the antenna 205 and/or the antenna 207.

The shield 204 is located and may be coupled to lateral surfaces of the antenna device 200. For example, the shield 204 may be formed on a first lateral surface, a second lateral surface, a third lateral surface and/or a fourth lateral surface of the antenna device 200. The shield 204 includes at least one metal layer and/or metal portion. The shield 204 may be coupled to a bottom surface of the antenna device 200. The shield 204 may be configured as an electromagnetic interference (EMI) shield. The shield 204 may be an antenna shield. The shield 204 may or may not be directly touching the antenna 201, the antenna 203, the antenna 205 and the antenna 207.

Figure 3:
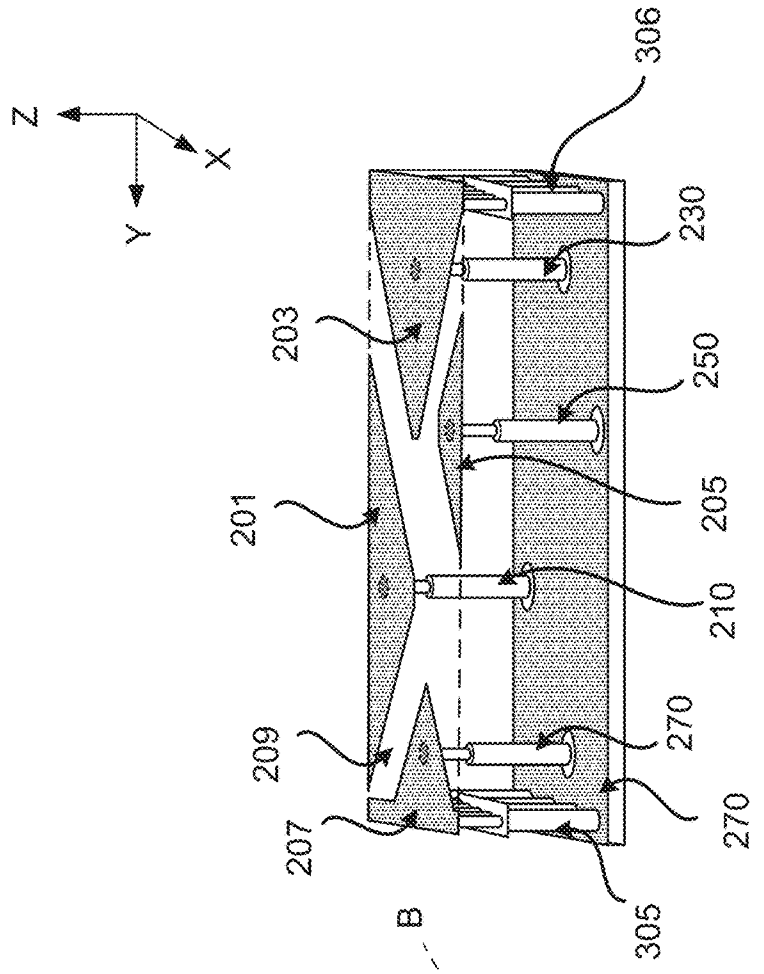
FIG. 3 illustrates an exemplary view of an antenna device comprising a slot opening
Figure 4:
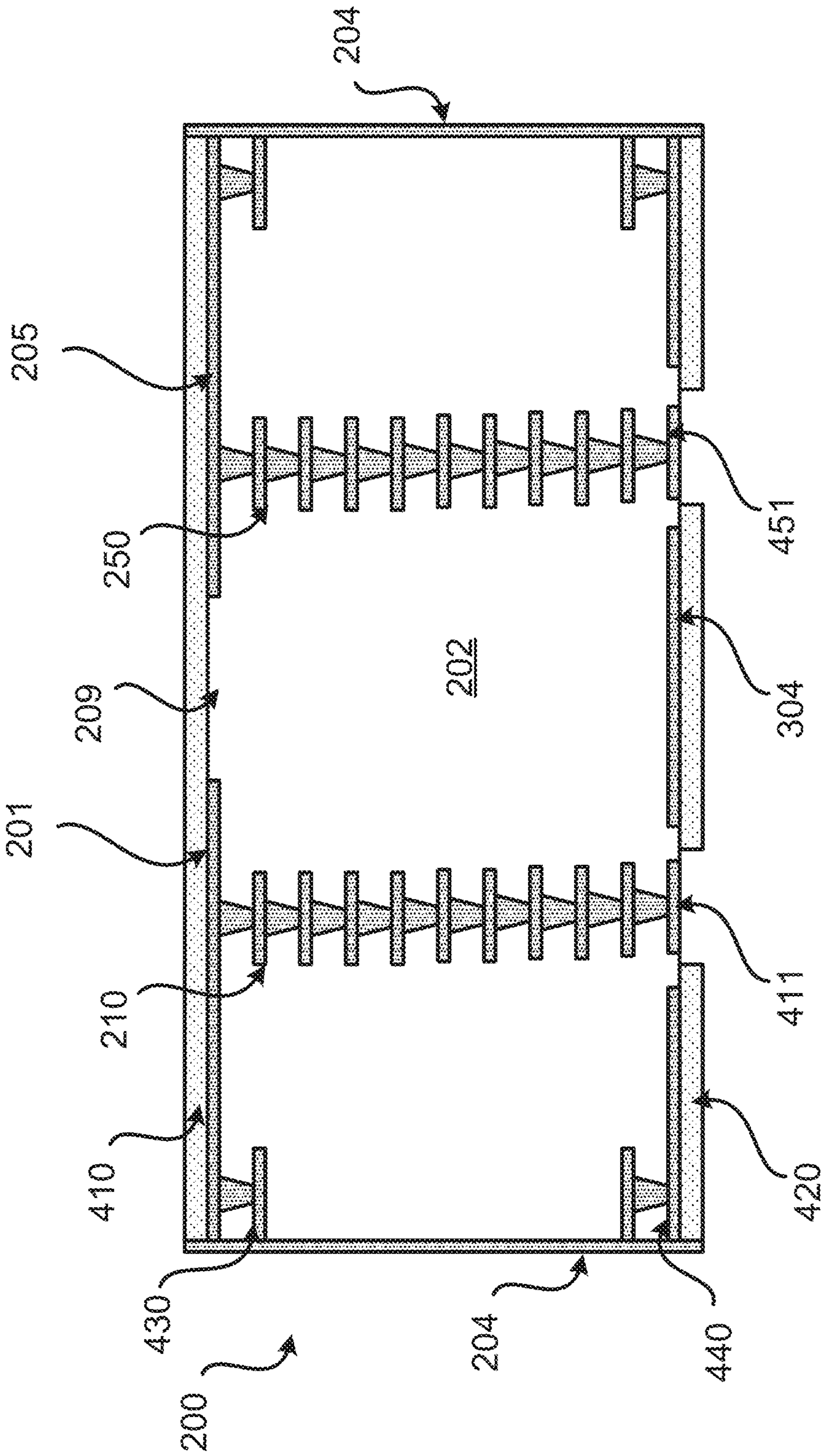
FIG. 4 illustrates an exemplary cross sectional profile view of an antenna device comprising a slot opening.

FIG. 3 illustrates another example of the antenna device 200. FIG. 3 illustrates some components that may be located in the antenna device 200 and/or surfaces of the antenna device 200. FIG. 3 does not necessarily illustrate all of the components of the antenna device 200. As shown in FIG. 3, the antenna device 200 includes the antenna 201, the antenna 203, the antenna 205, the antenna 207, a stack of vias 210, a stack of vias 230, a stack of vias 250, a stack of vias 270*a*, and a shield 304. The shield 304 may be located on a bottom surface of the antenna device 200. The shield 304 may be coupled to the shield 204. The shield 304 may be configured as an electromagnetic interference (EMI) shield. The shield 304 may be an antenna shield. The shield 304 may be configured to be electrically coupled to ground. The shield 304 includes at least one metal layer and/or metal portion. For purpose of clarity, the shield 204 is not shown in FIG. 3. In some implementations, there may not be a shield 204. The stack of vias 210 is coupled to the antenna 201. Signals to and/or from the antenna 201 may travel through the stack of vias 210. The stack of vias 230 is coupled to the antenna 203. Signals to and/or from the antenna 203 may travel through the stack of vias 230. The stack of vias 250 is coupled to the antenna 205. Signals to and/or from the antenna 205 may travel through the stack of vias 250. The stack of vias 270 is coupled to the antenna 207. Signals to and/or from the antenna 207 may travel through the stack of vias 270. The stack of vias 210, the stack of vias 230, the stack of vias 250, and/or the stack of vias 270 may extend through openings in the shield 304. The stack of vias 210, the stack of vias 230, the stack of vias 250, and/or the stack of vias 270 may be coupled to a corresponding pad interconnect (for example, as shown in FIG. 4). A stack of vias may include one or more vias. A stack of vias may also include pads and/or traces between vias. For example, a stack of vias may include a repeating pattern of vias and pads. Thus, a stack of vias may include interconnects that alternate between vias and pads, that are coupled to each other.

The antenna device 200 may also include a stacked via wall 305 and a stacked via wall 306. As will be further described below, the stacked via wall 305 and/or the stacked via wall 306 may be configured to operate as a shield (e.g., electromagnetic interference shield). A stacked via wall may include a plurality of a stack of vias that are adjacent to each other. For example, a first stack of vias, a second stack of vias and a third stack of vias may be formed next to each other (e.g., in row arrangement or in column arrangement) to form a stacked via wall. A stacked via wall may include rows and/or columns of stacks of vias that form the equivalent of a wall. The stack of vias of a stacked via wall may be coupled to each other through interconnects. The stacked via wall 305 and/or the stacked via wall 306 may be optional. Moreover, there may be additional stacked via walls along and/or next to different edges and/or lateral surfaces of the antenna device 200 (e.g., such as along lateral surface near antenna 201 and/or along lateral surface near antenna 205). The stacked via wall 305 and/or the stacked via wall 306 may be used in conjunction with the shield 204 and/or in lieu of the shield 204. The stacked via wall 305 and/or the stacked via wall 306 may be configured to provide a lateral enclosure for the antenna device 200. In some implementations, a stacked via may include and/or be replaced with one via that extends through multiple metal layers. Examples of a stacked via wall are further described in at least FIGS. 21-26. It should be noted that positions and/or locations of the various components in the figures are exemplary.

FIG. 4 illustrates a profile view of the antenna device 200 through a cross section AA. The antenna device 200 includes the at least one dielectric layer 202, the shield 204, the slot opening 209, the stack of vias 210, the stack of vias 250, the shield 304, a solder resist layer 410, a solder resist layer 420, a plurality of interconnects 430, a plurality of interconnects 440, a pad interconnect 411 and a pad interconnect 451. The stack of vias 210 are coupled to the pad interconnect 411. The stack of vias 250 are coupled to the pad interconnect 451. The plurality of interconnects 440 are coupled to the shield 304. The some of the interconnects from the plurality of interconnects 440 may be considered to be part of the shield 304. The shield 304 may include a metal layer and/or a metal portion. As shown in FIG. 4, the stack of vias 210 includes combinations of vias and/or pads. Similarly, the stack of vias 250 includes combinations of vias and/or pads.

The solder resist layer 410 is coupled to a first surface of the antenna device 200. The solder resist layer 410 may be located over a first surface of the dielectric layer 202 and surfaces of the antenna 201, the antenna 203, the antenna 205 and the antenna 207. The solder resist layer 410 may be located over the slot opening 209 of the dielectric layer 202. The plurality of interconnects 430 may be located on one or more metal layers (e.g., two or more top metal layers) of the antenna device 200. The plurality of interconnects 430 may be coupled to the shield 204.

The solder resist layer 420 is coupled to a second surface of the antenna device 200. The solder resist layer 420 may be located over a second surface of the dielectric layer 202, the plurality of pad interconnects 310, and/or the plurality of pad interconnects 320. The plurality of interconnects 440 may be located on one or more metal layers (e.g., two or more bottom metal layers) of the antenna device 200. The plurality of interconnects 440 may be coupled to the shield 204. There are several openings in the solder resist layer 420 to expose pads that are part of electrical paths to electrically couple to the antenna of the antenna device 200.

Figure 5:
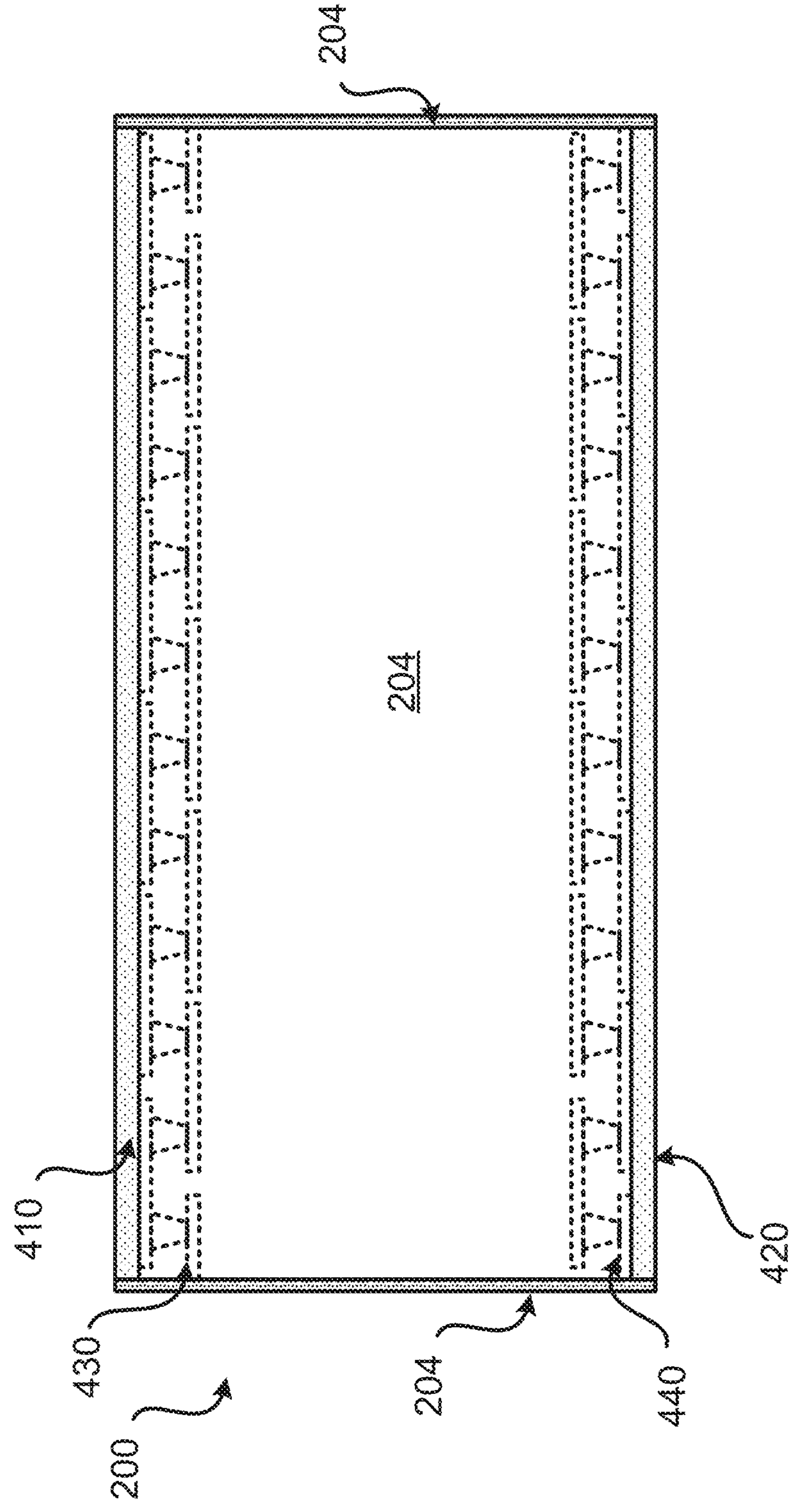
FIG. 5 illustrates an exemplary cross sectional profile view of an antenna device comprising a slot opening.

FIG. 5 illustrates a profile view of the antenna device 200 through a cross section BB. The antenna device 200 includes the at least one dielectric layer 202, the shield 204, a solder resist layer 410, a solder resist layer 420, a plurality of interconnects 430 and a plurality of interconnects 440.

Figure 6:
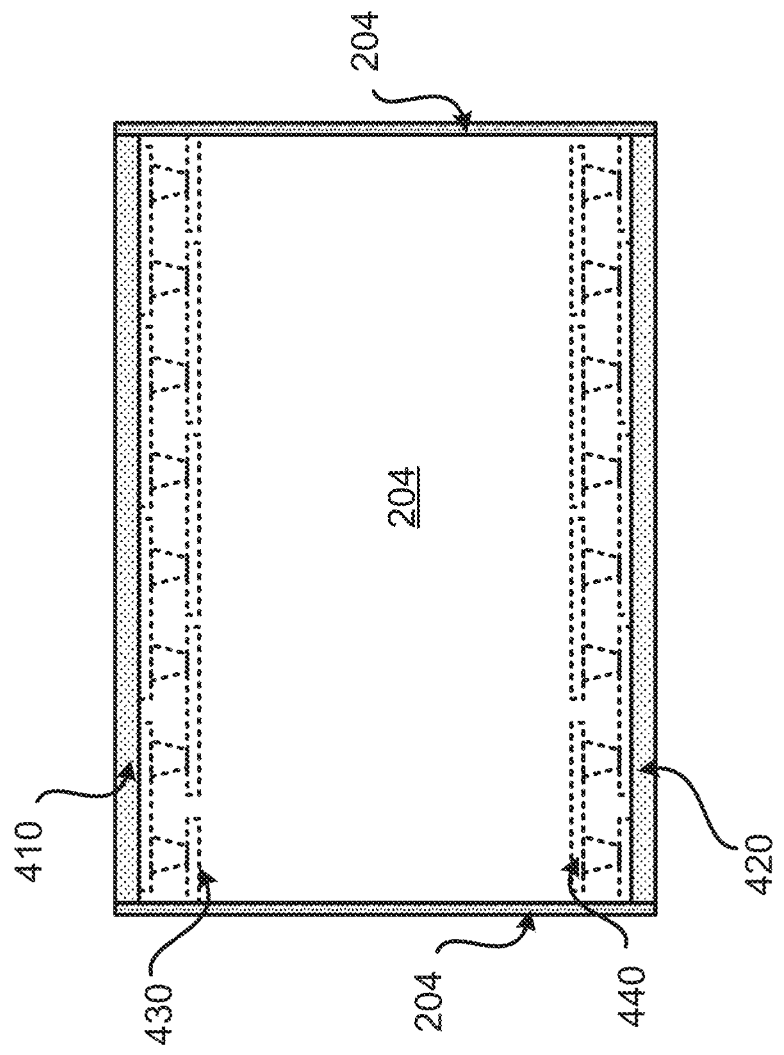
FIG. 6 illustrates an exemplary cross sectional profile view of an antenna device comprising a slot opening.

FIG. 6 illustrates a profile view of the antenna device 200 through a cross section CC. The antenna device 200 includes the at least one dielectric layer 202, the shield 204, a solder resist layer 410, a solder resist layer 420, a plurality of interconnects 430 and a plurality of interconnects 440.

Figure 7:
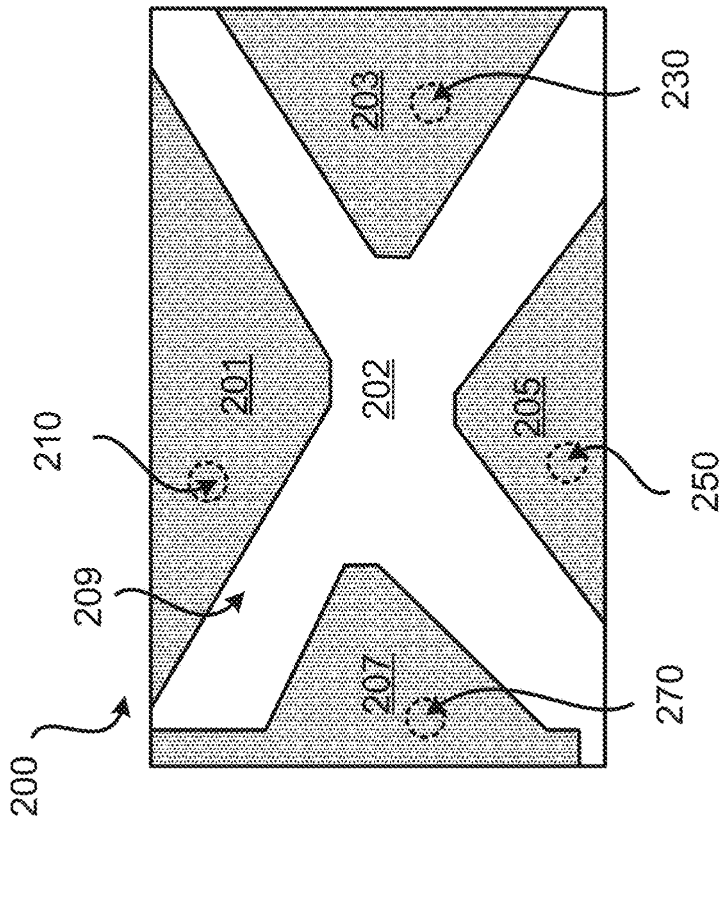
FIG. 7 illustrates an exemplary top plan view of an antenna device comprising a slot opening.

FIG. 7 illustrates a top plan view of the antenna device 200. The antenna device 200 includes the at least one dielectric layer 202, the slot opening 209, the antenna 201, the antenna 203, the antenna 205 and the antenna 207. The antenna 201, the antenna 203, the antenna 205 and/or the antenna 207 have a triangular planar shape. However, antenna 201, the antenna 203, the antenna 205 and/or the antenna 207 may have any planar shapes.

Figure 8:
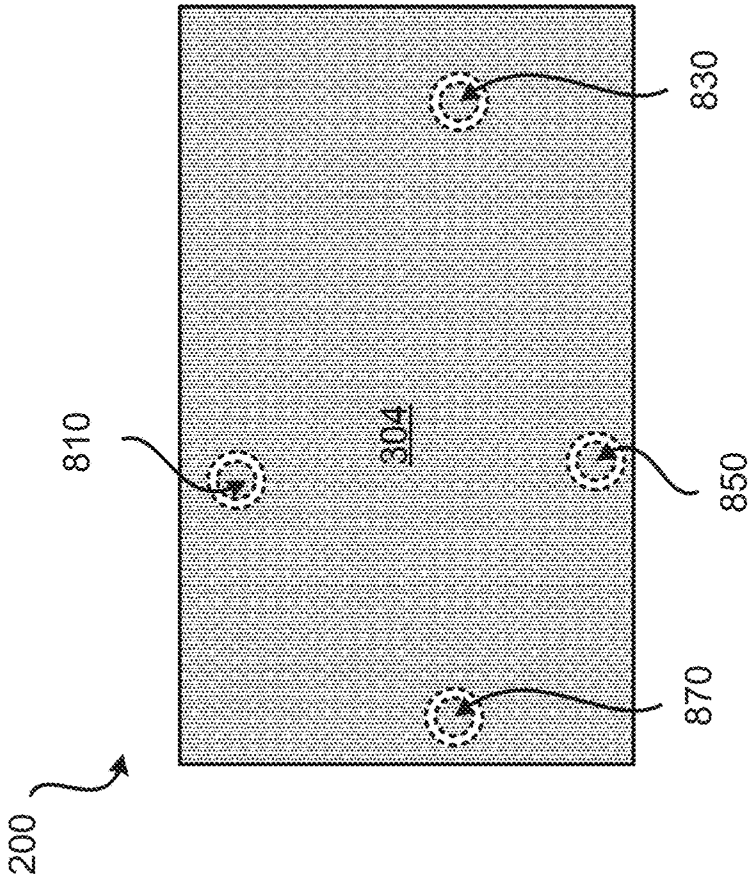
FIG. 8 illustrates an exemplary bottom plan view of an antenna device comprising a slot opening.

FIG. 8 illustrates a bottom plan view of the antenna device 200. The antenna device 200 includes the shield 304, the pad interconnect 810, the pad interconnect 830, the pad interconnect 850 and the pad interconnect 870. The pad interconnect 810 may be coupled to the stack of vias 210. The pad interconnect 830 may be coupled to the stack of vias 230. The pad interconnect 850 may be coupled to the stack of vias 250. The pad interconnect 870 may be coupled to the stack of vias 270. The pad interconnect 810, the pad interconnect 830, the pad interconnect 850, and/or the pad interconnect 870 may be used as ports for antennas of the antenna device 200.

Figure 10:
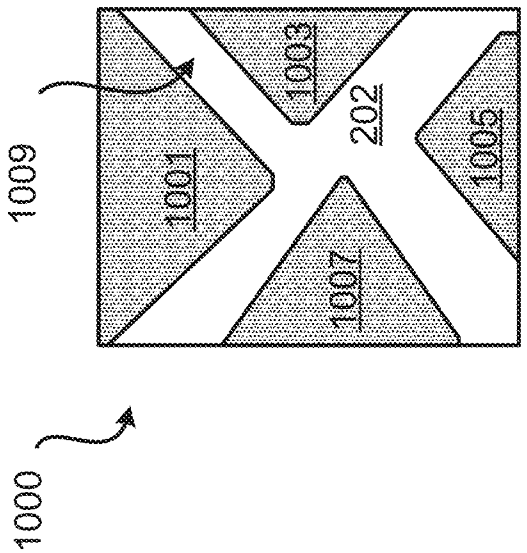
FIG. 10 illustrates an exemplary top plan view of an antenna device comprising a slot opening.
Figure 9:
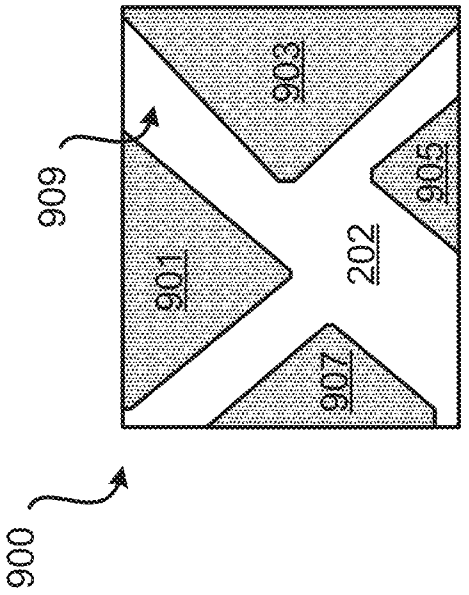
FIG. 9 illustrates an exemplary top plan view of an antenna device comprising a slot opening.

As mentioned above, different implementations may have antenna devices with different configurations of antennas. FIG. 9 illustrates an antenna device 900 that includes at least one dielectric layer 202, a slot opening 909, an antenna 901, an antenna 903, an antenna 905 and an antenna 907. FIG. 10 illustrates an antenna device 1000 that includes at least one dielectric layer 202, a slot opening 1009, an antenna 1001, an antenna 1003, an antenna 1005 and an antenna 1007.

As shown in at least FIGS. 9 and 10, the slot opening may have different shapes and/or sizes. Different numbers of antennas and/or different shapes in the antennas may produce different slot opening shapes.

Figure 11:
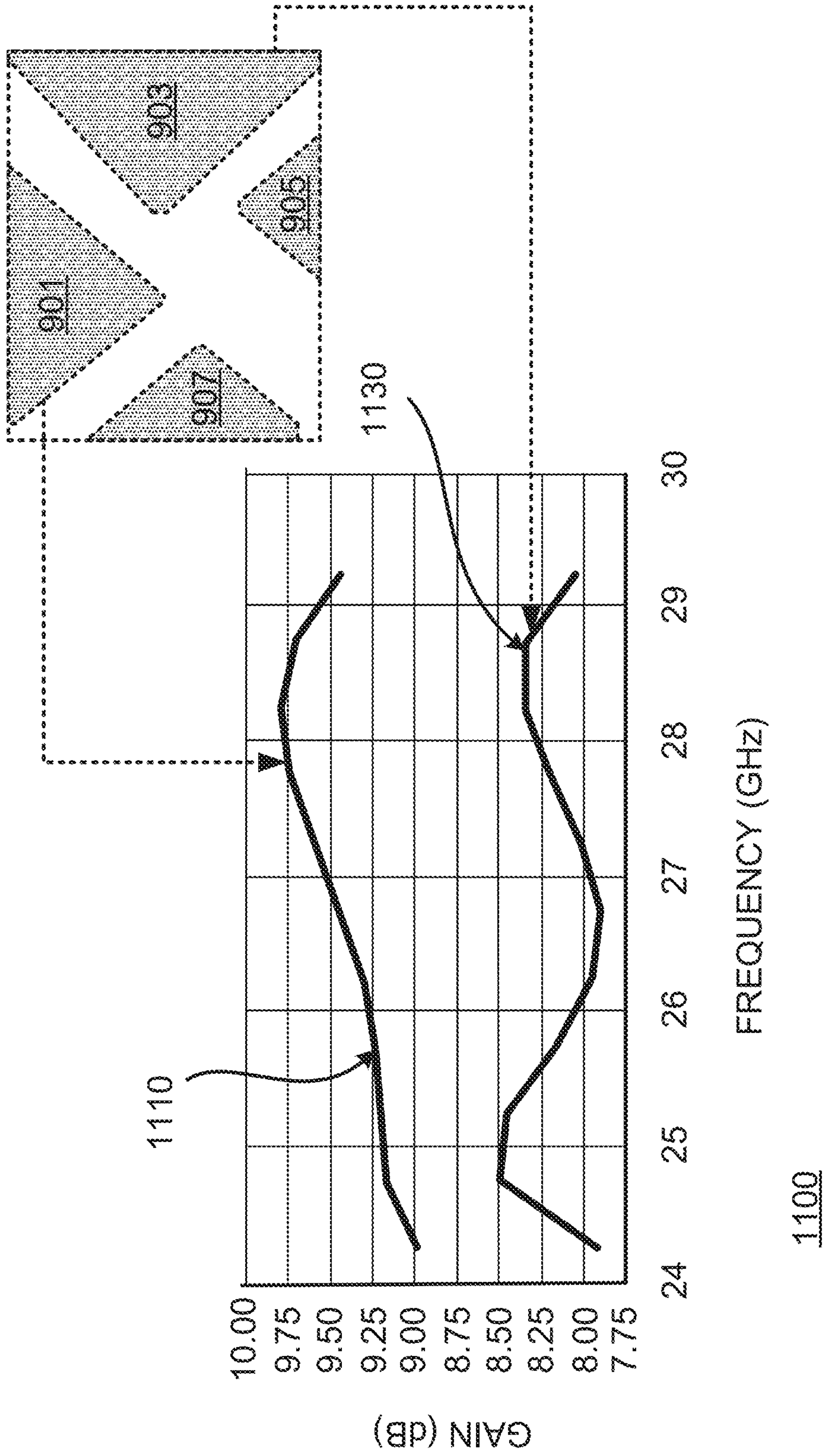
FIG. 11 illustrates a graph of antenna gains for two antennas of an antenna device comprising a slot opening.
Figure 12:
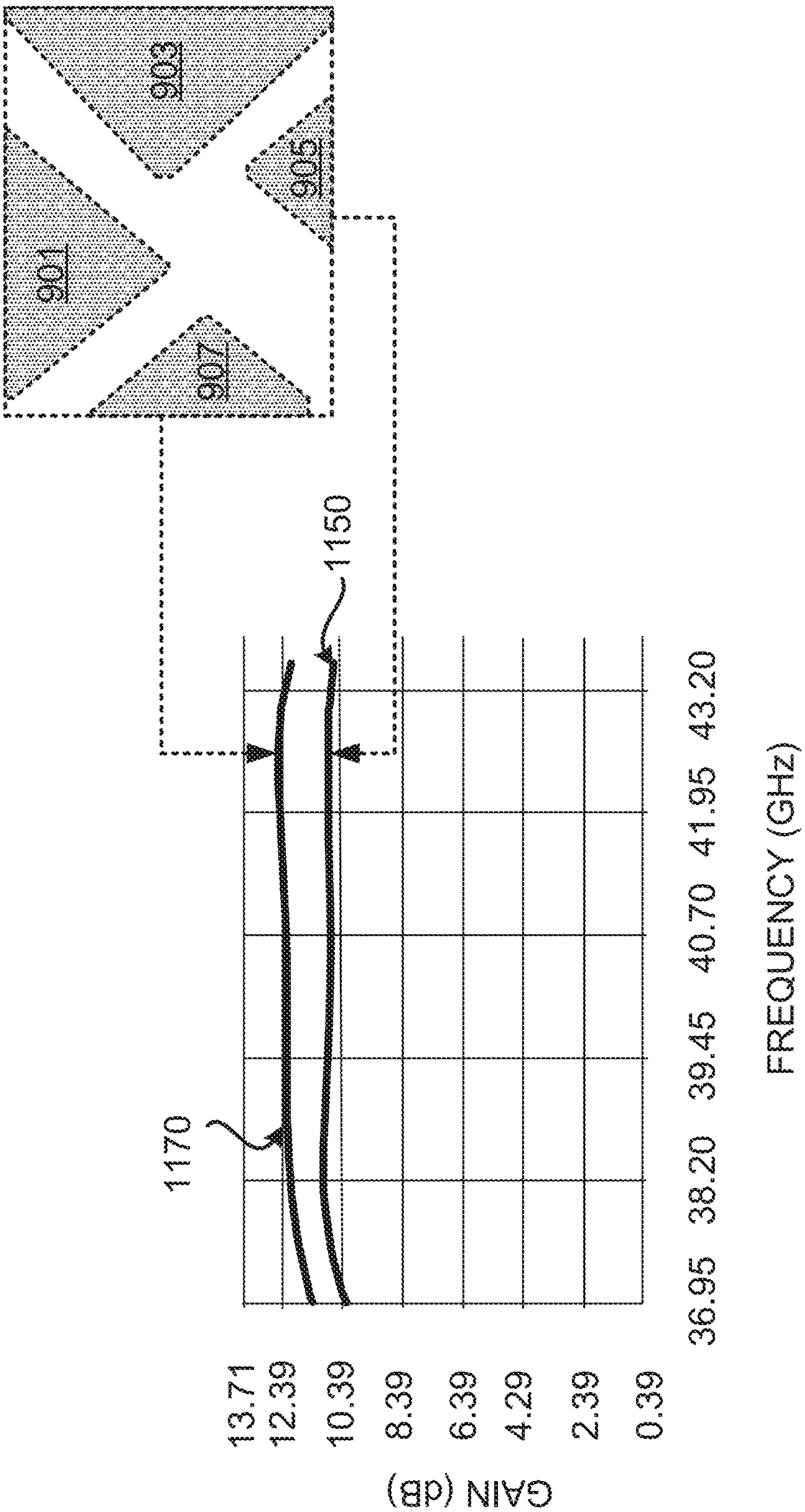
FIG. 12 illustrates a graph of antenna gains for two antennas of an antenna device comprising a slot opening.

FIG. 11 and FIG. 12, illustrate exemplary graphs of various gains at various frequencies for various antennas. FIG. 11 illustrates an exemplary graph 1100 that shows (i) a plot 1110 of the gains for the antenna 901 at various frequencies, and (ii) a plot 1130 of the gains for the antenna 903 at various frequencies. FIG. 12 illustrates an exemplary graph 1200 that shows (i) a plot 1150 of the gains for the antenna 905 at various frequencies, and (ii) a plot 1170 of the gains for the antenna 907 at various frequencies. FIGS. 11 and 12 illustrate how the design and/or location of the antennas of an antenna device can be configured to provide optimized and/or improved transmission and/or reception performance. In some implementations, triangle shapes or shapes that are approximately triangles of the antenna are configured such that the tips of the triangles are used for signal transmission. Other tips shapes may be used, such as oval shaped tips.

Figure 13:
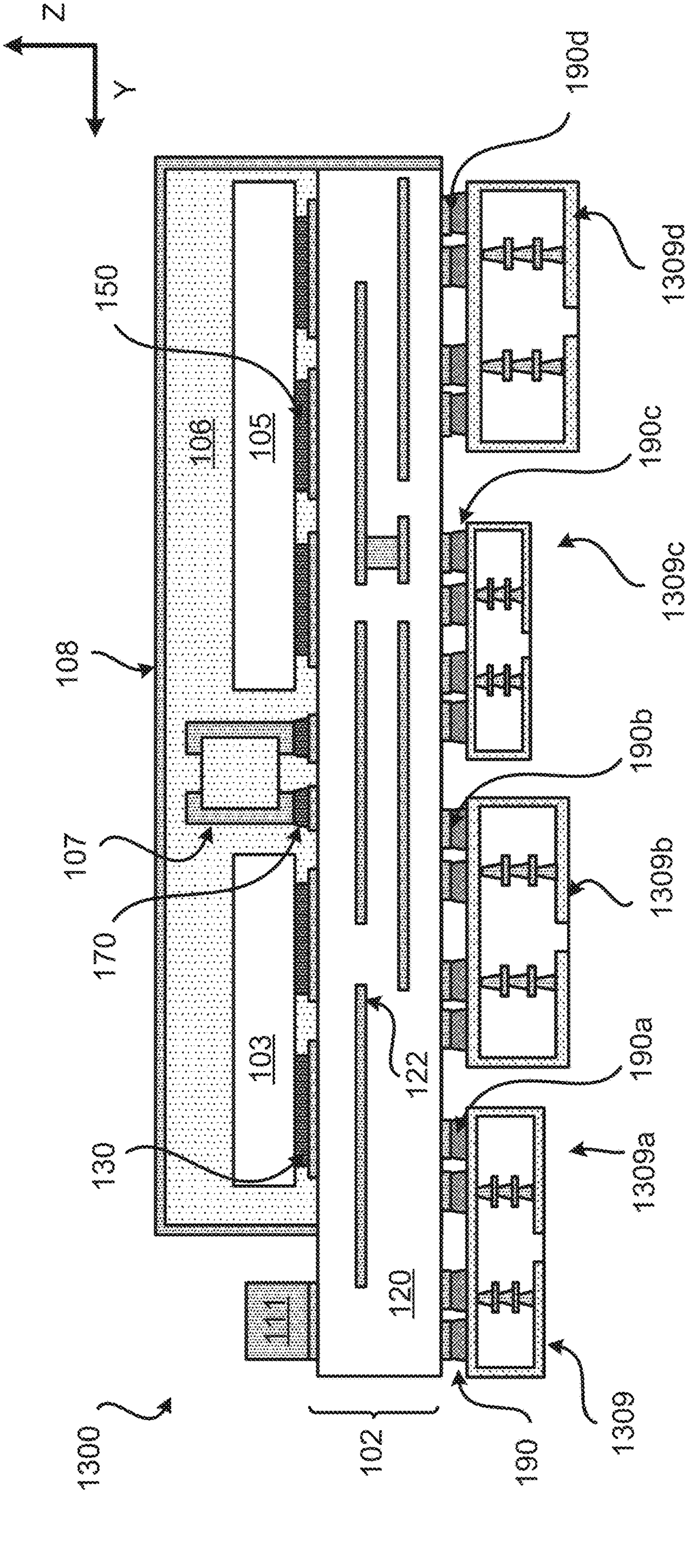
FIG. 13 illustrates an exemplary profile view of another antenna package that includes an antenna device comprising a slot opening.

FIG. 13 illustrates a profile view of a package 1300 that includes an antenna device with a slot opening. The package 1300 may be an antenna package. The package 1300 includes a substrate 102, an integrated device 103, an integrated device 105, a passive device 107, an encapsulation layer 106, a shield 108, a plurality of antenna devices 1309 and a connector 111. One or more antenna devices from the plurality of antenna devices 1309, include a slot opening.

The package 1300 is similar to the package 100, and includes similar and/or the same components as the package 100, and are arranged in a similar manner as the package 100. The package 1300 includes antenna devices with different sizes and/or thicknesses. The plurality of antenna devices 1309 includes an antenna device 1309*a*, an antenna device 1309*b*, an antenna device 1309*c* and an antenna device 1309*d*. The antenna device 1309*a*, the antenna device 1309*b*, the antenna device 1309*c* and/or the antenna device 1309*d* may have different sizes and/or thicknesses. One or more antenna devices from the plurality of antenna devices 1309 may be represented by the antenna device 200.

The antenna device 1309*a* may be configured to transmit and/or receive signals at a first frequency and/or a first range of frequencies. The antenna device 1309*b* may be configured to transmit and/or receive signals at a second frequency and/or a second range of frequencies. The antenna device 1309*c* may be configured to transmit and/or receive signals at a third frequency and/or a third range of frequencies. The antenna device 1309*d* may be configured to transmit and/or receive signals at a fourth frequency and/or a fourth range of frequencies.

The antenna device 1309*a* is coupled to a second surface of the substrate 102 through the plurality of solder interconnects 190*a*. The plurality of solder interconnects 190*a* is coupled to the antenna device 1309*a* and interconnects from the plurality of interconnects 122 of the substrate 102. The antenna device 1309*b* is coupled to a second surface of the substrate 102 through the plurality of solder interconnects 190*b*. The plurality of solder interconnects 190*b* is coupled to the antenna device 1309*b* and interconnects from the plurality of interconnects 122 of the substrate 102. The antenna device 1309*c* is coupled to a second surface of the substrate 102 through the plurality of solder interconnects 190*c*. The plurality of solder interconnects 190*c* is coupled to the antenna device 1309*c* and interconnects from the plurality of interconnects 122 of the substrate 102. The antenna device 1309*d* is coupled to a second surface of the substrate 102 through the plurality of solder interconnects 190*d*. The plurality of solder interconnects 190*d* is coupled to the antenna device 1309*d* and interconnects from the plurality of interconnects 122 of the substrate 102.

Figure 14:
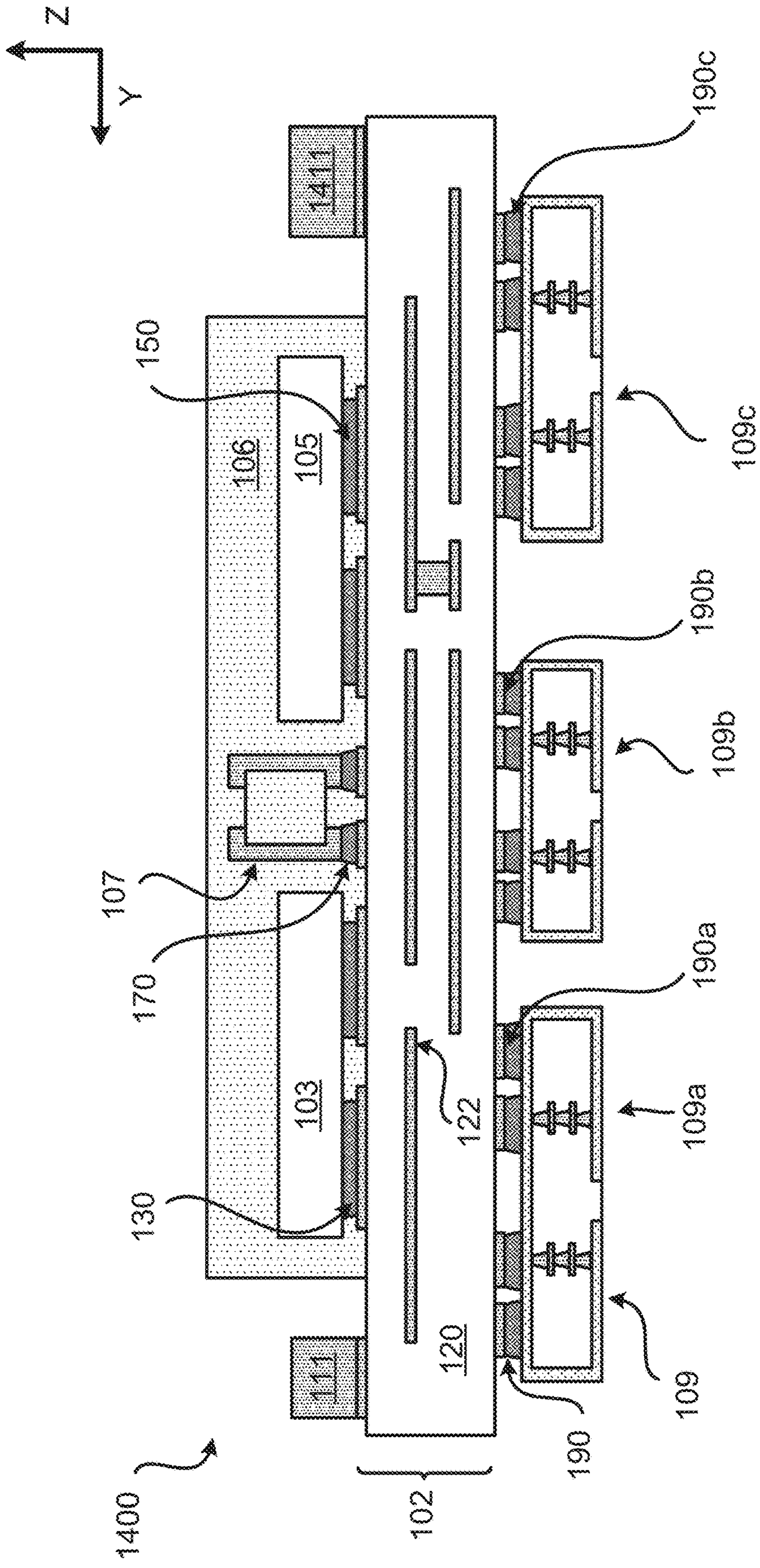
FIG. 14 illustrates an exemplary profile view of another antenna package that includes an antenna device comprising a slot opening.

FIG. 14 illustrates a profile view of a package 1400 that includes an antenna device with a slot opening. The package 1400 may be an antenna package. The package 1400 includes a substrate 102, an integrated device 103, an integrated device 105, a passive device 107, an encapsulation layer 106, a shield 108, a plurality of antenna devices 109, a connector 111 and a connector 1411. One or more antenna devices from the plurality of antenna devices 109, include a slot opening.

The package 1400 is similar to the package 100, and includes similar and/or the same components as the package 100, and are arranged in a similar manner as the package 100. The package 1400 includes two connectors (e.g., connector 1111 and connector 1411) and antenna devices arranged in an array. The connector 1411 is similar to the connector 111. In some implementations, the connector 111 may be configured to be electrically coupled to a first set of antenna devices from the plurality of antenna devices 109, and the connector 1411 may be configured to be electrically coupled to a second set of antenna devices from the plurality of antenna devices 109.

The connector 1411 is configured to provide electrical paths for millimeter wave signals. The connector 1411 may include interconnects configured as coaxial interconnects. A connector 1411 may include a plurality of pins (not shown). The plurality of pins may be configured to provide electrical paths for power, ground and signals (e.g., millimeter wave signals). The connector 1411 may be configured to be electrically coupled to the integrated device 103, the integrated device 105 and/or the plurality of antenna devices 109, through the substrate 102. A cable (not shown) may be coupled to the connector 1411. The cable (not show) may be configured to be coupled to a board (e.g., printed circuit board).

Figure 15:
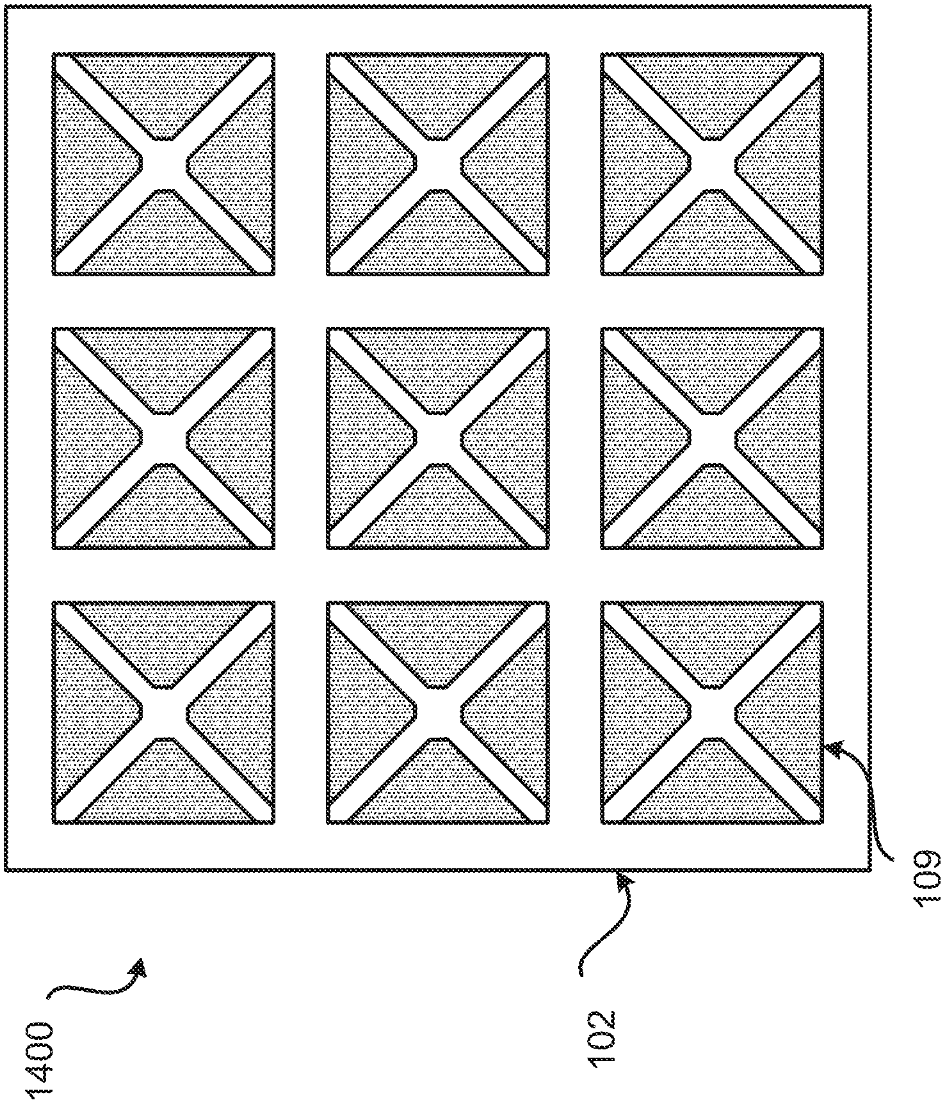
FIG. 15 illustrates an exemplary plan view of an antenna package that includes an antenna device comprising a slot opening.

As mentioned above, the antenna devices may be arranged in an array. FIG. 15 illustrates a bottom plan view of the package 1400. FIG. 15 illustrates that the plurality of antenna devices 109 are arranged in 3×3 array of integrated devices. It is noted that different implementations may use different array dimensions. The antenna devices may be oriented in a same direction. However, in some implementations, one or more antenna devices may be oriented and/or angled in different directions. Different antenna devices may have different sizes and/shapes. Different antenna devices may have different numbers of antennas. Different antenna devices may have different shapes for their antennas.

Figure 16:
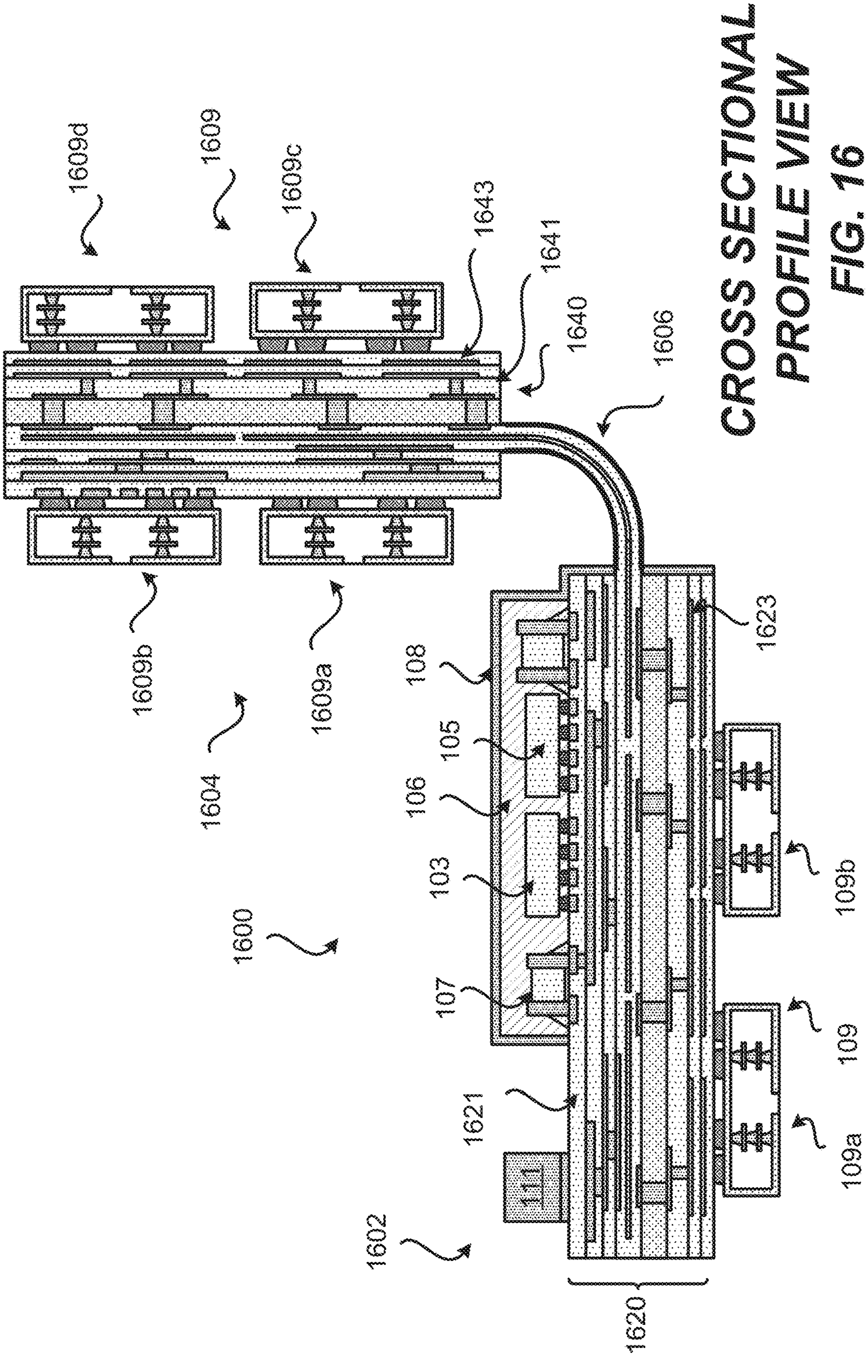
FIG. 16 illustrates an exemplary profile view of another antenna package that includes an antenna device comprising a slot opening.

FIG. 16 illustrates a profile view of a package device 1600 that includes a package 1602, a package 1604, and a flexible connection 1606. As will be further described below, the package device 1600 includes multi-directional antennas that help improve the performance of the package device 1600.

The package 1602 (e.g., first package) includes a substrate 1620 (e.g., first substrate), one or more integrated devices (e.g., 103, 105), one or more passive devices (e.g., 107), an encapsulation layer 106, a shield 108, a plurality of antenna devices 109 and a connector 111. The substrate 1620 includes one or more dielectric layers 1621 and a plurality of interconnects 1623. The plurality of antenna devices 109 include an antenna device 109*a* and an antenna device 109*b*.

The antenna device 109*a* and the antenna device 109*b* are coupled to a surface of the substrate 1620 through at least a plurality of solder interconnects.

The package 1604 (e.g., second package) includes a substrate 1640 (e.g., second substrate) and a plurality of antenna devices 1609. The substrate 1640 includes one or more dielectric layers 1641 and a plurality of interconnects 1643. The plurality of antenna devices 1609 include an antenna device 1609*a*, an antenna device 1609*b*, an antenna device 1609*c* and an antenna device 1609*d*. The antenna device 1609*a* and the antenna device 1609*b* are coupled to a first surface of the substrate 1640. The antenna device 1609*c* and the antenna device 1609*d* are coupled to a second surface of the substrate 1640.

The package 1602 is coupled to the package 1604 though the flexible connection 1606. Thus, the flexible connection 1606 may be coupled to the package 1602 (e.g., first package) and the package 1604 (e.g., second package). The flexible connection 1606 may be embedded in the package 1602 and the package 1604. The flexible connection 1606 includes at least one dielectric layer and at least one interconnect. The at least one dielectric layer may include polyimide or liquid crystal polymer. The flexible connection 1606 may be configured to electrically couple the package 1602 and the package 1604. The flexible connection 1606 may be configured to allow different currents (e.g., signal, power, ground) to travel between the package 1602 and the package 1604. For example, the flexible connection 1606 may include (i) at least one first interconnect configured for a signal (e.g., input/output signal), (ii) at least one second interconnect configured for power, and (iii) at least one third interconnect configured for ground. The flexible connection 1606 is bendable such that the package 1604 may be positioned at an angle to the package 1602, and vice versa. The flexible connection 1606 may be means for flexible connection. Although not shown, the flexible connection 1606 may include a cover protective material or be covered with a protective material. In at least some implementations, the flexible connection 1606 may be configured to be bendable up to 180 degrees without fracturing. Thus, for example, components of the flexible connection 1606, such as the at least one dielectric layer and the at least one interconnect, may bend up to 180 degrees without causing damage, a crack and/or a fracture in the flexible connection 1606. Various implementations of the flexible connection 1606 may be bendable up to different degrees. For example, in at least some implementations, the flexible connection 1606 may be configured to be bendable up to 90 degrees without fracturing and/or cracking. In at least some implementations, the flexible connection 1606 may be configured to be bendable by at least 10 degrees (or more) without fracturing and/or cracking. The term "flexible" may mean that a component is (i) bendable by at least 10 degrees (or more) without fracturing and/or cracking, and/or (ii) bendable up to 180 degrees without fracturing and/or cracking.

An electrical path between an antenna device from the plurality of antenna devices 1609 and an integrated device (e.g., 103, 105) may include solder interconnects between the antenna device (e.g., 1609*a*) and the substrate 1640, interconnects from the substrate 1640, interconnects from the flexible connection 1606, interconnects from the substrate 1620 and a solder interconnect from a plurality of solder interconnects between an integrated device and the substrate 1620.

An electrical path between an antenna device from the plurality of antenna devices 109 and an integrated device (e.g., 103, 105) may include solder interconnects between the antenna device (e.g., 109*a*) and the substrate 1620, interconnects from the substrate 1620 and a solder interconnect from a plurality of solder interconnects between an integrated device and the substrate 1620.

An electrical path between the connector 111 and an integrated device (e.g., 103, 105) may include interconnects from the substrate 1620, and a solder interconnect from a plurality of solder interconnects between an integrated device and the substrate 1620.

The package device and/or the packages, described in the disclosure may include a radio frequency (RF) package. The package device and/or the packages may be configured to provide Wireless Fidelity (WiFi) communication and/or cellular communication (e.g., 2G, 3G, 4G, 5G, 6G). The package device and/or the packages may be configured to support Global System for Mobile Communications (GSM), Universal Mobile Telecommunications System (UMTS), and/or Long-Term Evolution (LTE). The package device and/or the packages may be configured to transmit and receive signals having different frequencies and/or communication protocols.

An integrated device may include a die (e.g., semiconductor bare die). The integrated device may include a power management integrated circuit (PMIC). The integrated device may include an application processor. The integrated device may include a modem. The integrated device may include a radio frequency (RF) device, a passive device, a filter, a capacitor, an inductor, an antenna, a transmitter, a receiver, a gallium arsenide (GaAs) based integrated device, a surface acoustic wave (SAW) filter, a bulk acoustic wave (BAW) filter, a light emitting diode (LED) integrated device, a silicon (Si) based integrated device, a silicon carbide (SiC) based integrated device, a memory, power management processor, and/or combinations thereof. An integrated device may include at least one electronic circuit (e.g., first electronic circuit, second electronic circuit, etc. . . . ). An integrated device may include transistors. An integrated device may be an example of an electrical component and/or electrical device. In some implementations, an integrated device may include a chiplet. A chiplet may be fabricated using a process that provides better yields compared to other processes that are used to fabricate other types of integrated devices, which can lower the overall cost of fabricating a chiplet. Different chiplets may have different sizes and/or shapes. Different chiplets may be configured to provide different functions. Different chiplets may have different interconnect densities (e.g., interconnects with different width and/or spacing). In some implementations, several chiplets may be used to perform the functionalities of one or more chips (e.g., one more integrated devices). Using several chiplets that perform several functions may reduce the overall cost of a package relative to using a single chip to perform all of the functions of a package.

Exemplary Sequence for Fabricating an Antenna Device

Figure 17A:
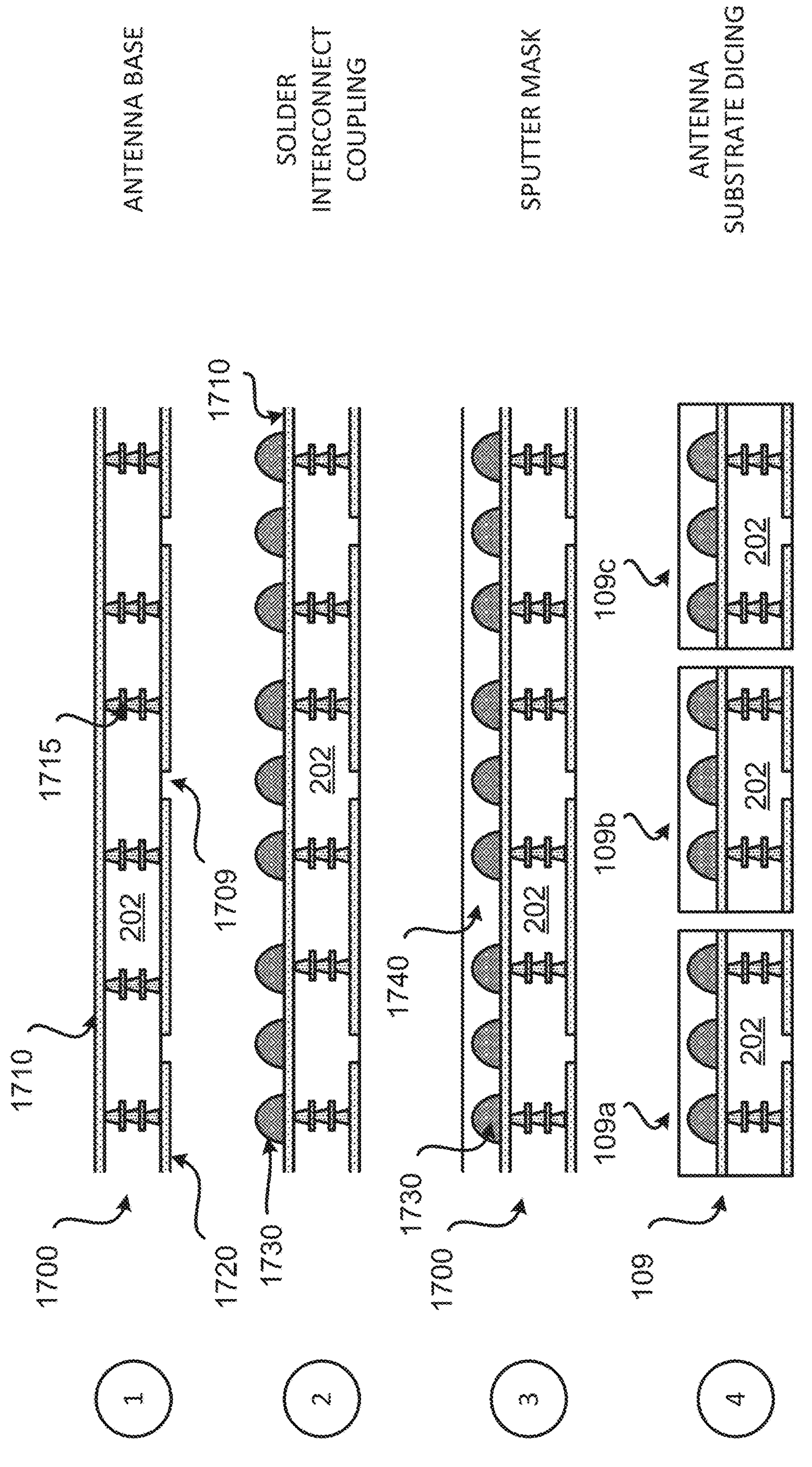
FIGS. 17A-17B illustrate an exemplary sequence for fabricating a package comprising an antenna device with a slot opening.
Figure 17B:
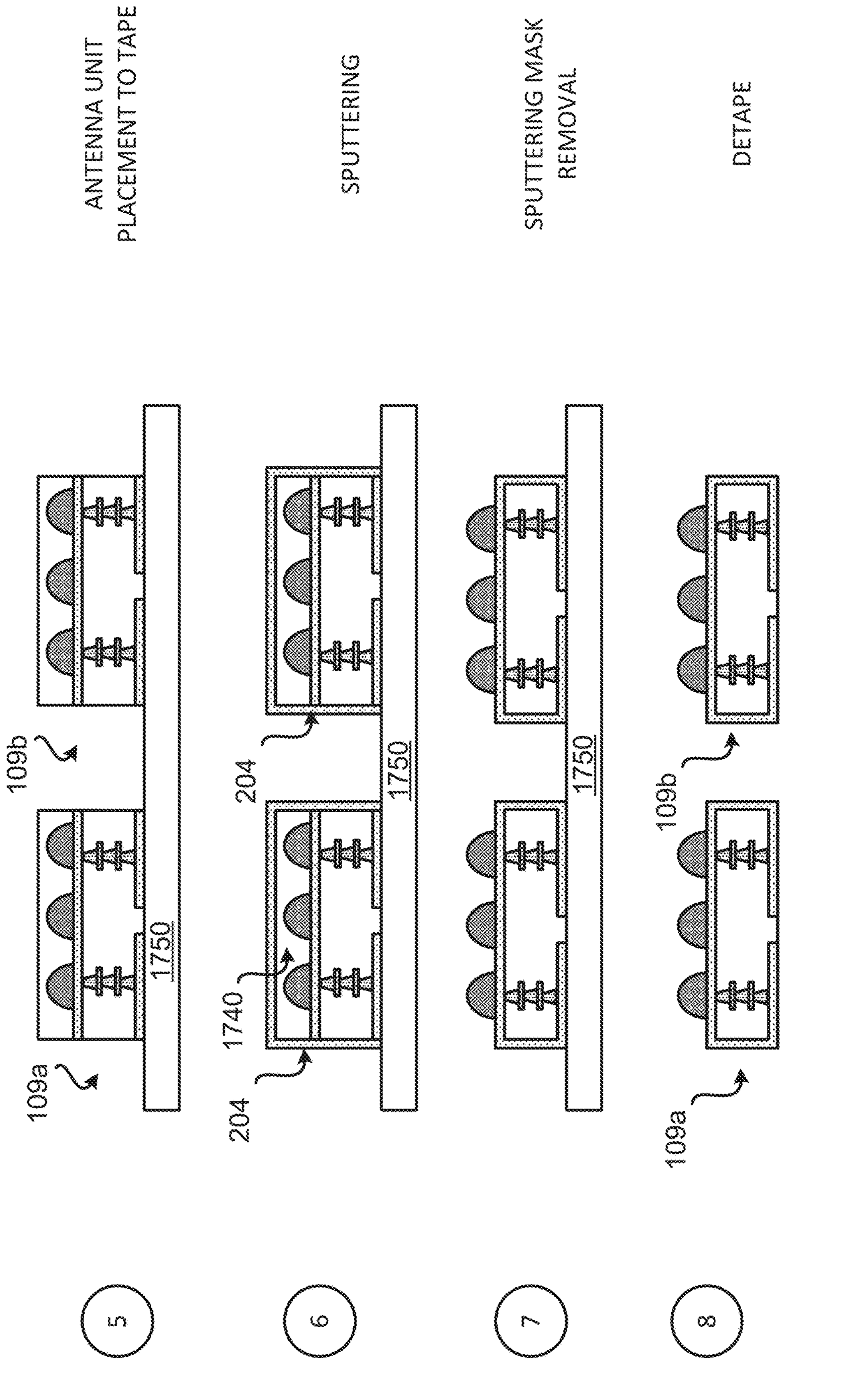

FIGS. 17A-17B illustrate an exemplary sequence for providing or fabricating an antenna device. In some implementations, the sequence of FIGS. 17A-17B may be used to provide or fabricate any of the substrates described in the disclosure. In some implementations, the sequence of FIGS. 17A-17B may be used to provide or fabricate the antenna device (e.g., 109*a*) described in the disclosure.

It should be noted that the sequence of FIGS. 17A-17B may combine one or more stages in order to simplify and/or clarify the sequence for providing or fabricating an antenna device. In some implementations, the order of the processes may be changed or modified. In some implementations, one or more of processes may be replaced or substituted without departing from the spirit of the disclosure. Different implementations may fabricate a substrate differently.

Stage 1, as shown in FIG. 17A, illustrates a state after an antenna base 1700 is provided and/or fabricated. The antenna base 1700 may include at least one dielectric layer 202, a patterned metal layer 1710, and a patterned metal layer 1720. The patterned metal layer 1710 may be configured to operate as interconnects and/or a shield. The patterned metal layer 1720 may be configured to operate as interconnects and/or antennas. The antenna base 1700 may include a plurality of slot openings 1709. The antenna base 1700 may also include a plurality of stack of vias 1715. An example of providing and/or fabricating an antenna base is described in detail in at least FIGS. 19A-19E.

Stage 2 illustrates a state after a plurality of solder interconnects 1730 are coupled to the antenna base 1700. A solder reflow process may be used to couple the plurality of solder interconnects 1730 to the antenna base 1700.

Stage 3 illustrates a state after a mask layer 1740 is coupled to the antenna base 1700. The mask layer 1740 may be a sputter mask. The mask layer 1740 may cover the plurality of solder interconnects 1730. A deposition and/or a lamination process may be used to form the mask layer 1740. The mask layer 1740 may be coupled to a surface of the antenna base 1700.

Stage 4 illustrates a state after the antenna base 1700 is singulated into individual antenna devices 109. A dicing process (e.g., mechanical dicing) may be used to singulate the antenna base 1700 into at least an antenna device 109*a*, an antenna device 109*b* and an antenna device 109*c*. Each of the antenna device may include a slot opening.

Stage 5, as shown in FIG. 17B, illustrates a state after the antenna device 109*a* and the antenna device 109*b* are coupled to a tape 1750. The tape 1750 may include a carrier. The side of the antenna device that includes the slot opening may be coupled to the tape 1750.

Stage 6 illustrates a state after the shield 204 are formed on at least the lateral surfaces of the antenna devices (e.g., 109*a*). The shield 204 is also formed on the surface of the mask layer 1740. A sputtering process may be used to form the shield 204. The shield 204 may include at least one metal layer and/or a metal portion.

Stage 7 illustrates a state after the mask layer 1740 is removed from each antenna device. Removing the mask layer 1740 may also remove portions of the shield 204. Removing the mask layer 1740 may expose the plurality of solder interconnects 1730.

Stage 8 illustrates a state after the plurality of antenna devices 109 are decoupled from the tape 1750. Each antenna device may be detached from the tape 1750. The antenna device (e.g., 109*a*, 109*b*) may include at least one dielectric layer 202, a plurality of interconnects, a shield 204, a plurality of antennas, a plurality of a stack of vias and a slot opening (e.g., as described in at least FIGS. 2-6).

Exemplary Flow Diagram of a Method for Fabricating an Antenna Device

Figure 18:
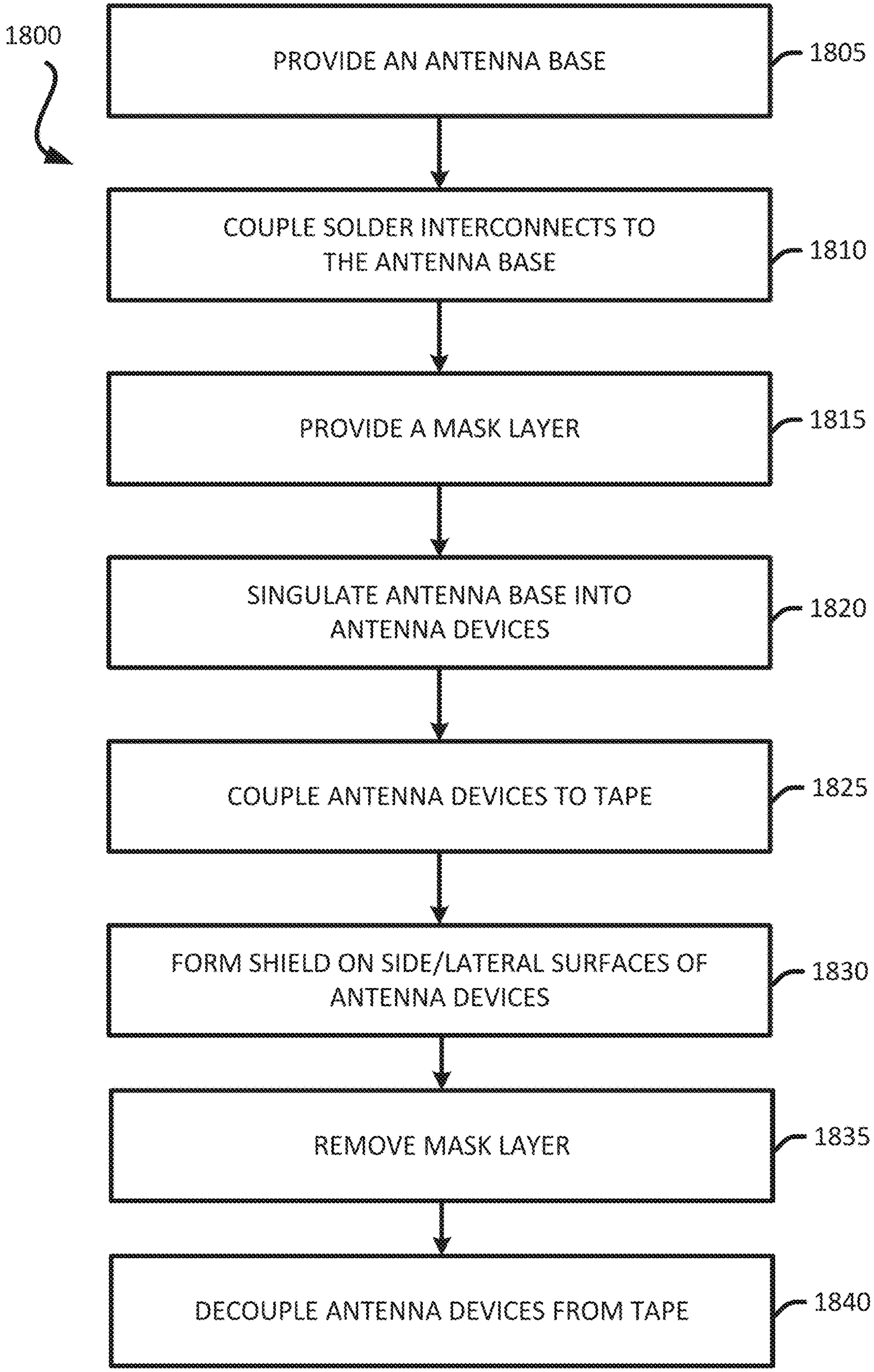
FIG. 18 illustrates an exemplary sequence for fabricating a package comprising an antenna device with a slot opening.

In some implementations, fabricating an antenna device includes several processes. FIG. 18 illustrates an exemplary flow diagram of a method 1800 for providing or fabricating an antenna device. In some implementations, the method 1800 of FIG. 18 may be used to provide or fabricate the antenna device (e.g., 109*a*). The method 1800 may be implemented on a base (e.g., substrate) and then singulated into several antenna devices.

It should be noted that the method 1800 of FIG. 18 may combine one or more processes in order to simplify and/or clarify the method for providing or fabricating an antenna device. In some implementations, the order of the processes may be changed or modified.

The method provides (at 1805) an antenna base. Stage 1 of FIG. 17A, illustrates and describes an example of a state after an antenna base 1700. The antenna base 1700 may include a dielectric layer 202, a patterned metal layer 1710, a patterned metal layer 1720, and a plurality of stack of vias 1715. The antenna base 1700 may be an antenna substrate. The antenna base 1700 may include a substrate panel (e.g., antenna substrate panel). The patterned metal layer 1710 may be configured to operate as interconnects and/or a shield. The patterned metal layer 1720 may be configured to operate as interconnects and/or antennas. The antenna base 1700 may include a plurality of slot openings 1709. An example of providing and/or fabricating an antenna base is described in detail in at least FIGS. 19A-19E.

The method couples (at 1810) a plurality of solder interconnects to the antenna base. Stage 2 of FIG. 17A, illustrates and describes an example of a state after a plurality of solder interconnects 1730 are coupled to the antenna base 1700. A solder reflow process may be used to couple the plurality of solder interconnects 1730 to the antenna base 1700.

The method provides and couples (at 1815) a mask layer to the antenna base. Stage 3 of FIG. 17A, illustrates and describes an example of a state after a mask layer 1740 is coupled to the antenna base 1700. The mask layer 1740 may be a sputter mask. The mask layer 1740 may cover the plurality of solder interconnects 1730. A deposition and/or a lamination process may be used to form the mask layer 1740. The mask layer 1740 may be coupled to a surface of the antenna base 1700.

The method singulates (at 1820) the antenna base into individual antenna devices. Stage 4 of FIG. 17A, illustrates and describes an example of a state after the antenna base 1700 is singulated into individual antenna devices 109. A mechanical dicing process may be used to singulate the antenna base 1700 into at least an antenna device 109*a*, an antenna device 109*b* and an antenna device 109*c*. Each of the antenna device may include a slot opening.

The method couples (at 1825) antenna devices to a tape. Stage 5 of FIG. 17B, illustrates and describes an example of a state after the antenna device 109*a* and the antenna device 109*b* are coupled to a tape 1750. The tape 1750 may include a carrier. The portion of the antenna device that includes the slot opening may be coupled to the tape 1750.

The method forms (at 1830) a shield on side surfaces and/or lateral surfaces of the antenna devices. Stage 6 of FIG. 17B, illustrates and describes an example of a state after the shield 204 are formed on at least the lateral surfaces of the antenna devices (e.g., 109*a*). The shield 204 is also formed on the surface of the mask layer 1740. A sputtering process may be used to form the shield 204. The shield 204 may include at least one metal layer.

The method removes (at 1835) the mask layer from the antenna devices. Stage 7 of FIG. 17B, illustrates and describes an example of a state after the mask layer 1740 is removed from each antenna device. Removing the mask layer 1740 may also remove portions of the shield 204. Removing the mask layer 1740 may expose the plurality of solder interconnects 1730.

The method decouples (at 1840) the antenna devices from the tape. Stage 8 of FIG. 17B, illustrates and describes an example of a state after the plurality of antenna devices 109 are decoupled from the tape 1750. Each antenna device may be detached from the tape 1750. The antenna device (e.g.,

109*a*, 109*b*) may include at least one dielectric layer 202, a plurality of interconnects, a shield 204, a plurality of antennas and a slot opening, Exemplary Sequence for Fabricating an Antenna Base FIGS. 19A-19E illustrate an exemplary sequence for providing or fabricating an antenna base. In some implementations, the sequence of FIGS. 19A-19E may be used to provide or fabricate any of the antenna bases described in the disclosure. In some implementations, the sequence of FIGS. 19A-19E may be used to provide or fabricate the antenna base 1700 described in the disclosure. The antenna base may be singulated to form several antenna devices.

It should be noted that the sequence of FIGS. 19A-19E may combine one or more stages in order to simplify and/or clarify the sequence for providing or fabricating an antenna base. In some implementations, the order of the processes may be changed or modified. In some implementations, one or more of processes may be replaced or substituted without departing from the spirit of the disclosure. Different implementations may fabricate an antenna base and/or an antenna substrate differently.

Figure 19A:
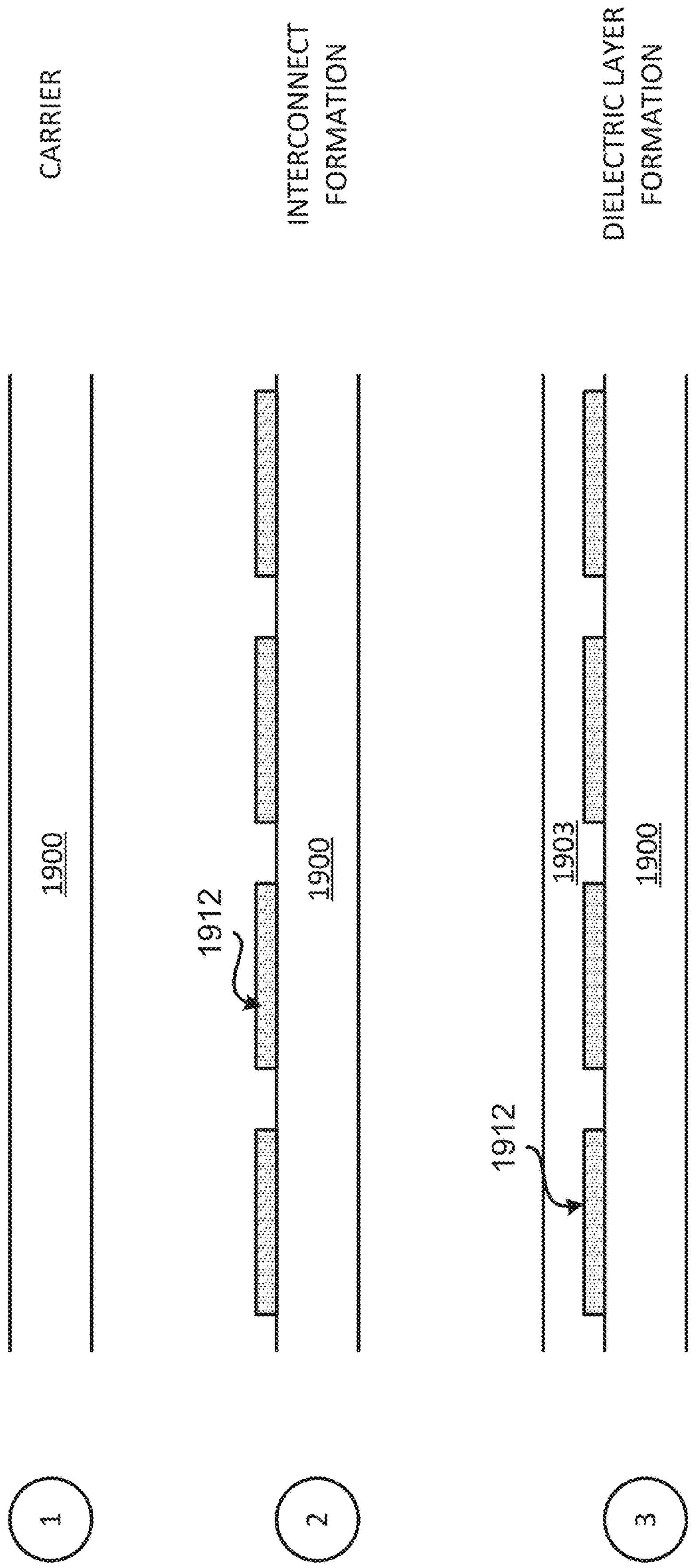
FIGS. 19A-19E illustrate an exemplary sequence for fabricating an antenna base.

Stage 1, as shown in FIG. 19A, illustrates a state after a carrier 1900 is provided. Different implementations may provide different types of a carrier. The carrier 1900 may include a core layer. A core layer may include a seed layer.

Stage 2 illustrates a state after a plurality of interconnects 1912 are formed over the carrier 1900. A plating process and a patterning process may be used to form the plurality of interconnects 1912. The plurality of interconnects 1912 may be formed over a seed layer of the carrier 1900 and/or the core layer.

Stage 3 illustrates a state after the dielectric layer 1903 is formed. The dielectric layer 1903 may be formed and coupled to the first surface of the carrier 1900. A deposition and/or a lamination to form the dielectric layer 1903. In some implementations, the dielectric layer 1903 may include Ajinomoto Build-up Film (ABF). In some implementations, the dielectric layer 1903 may include prepreg. In some implementations, the dielectric layer 1903 may include a polymer. The dielectric layer 1903 may be formed over the plurality of interconnects 1912.

Figure 19B:
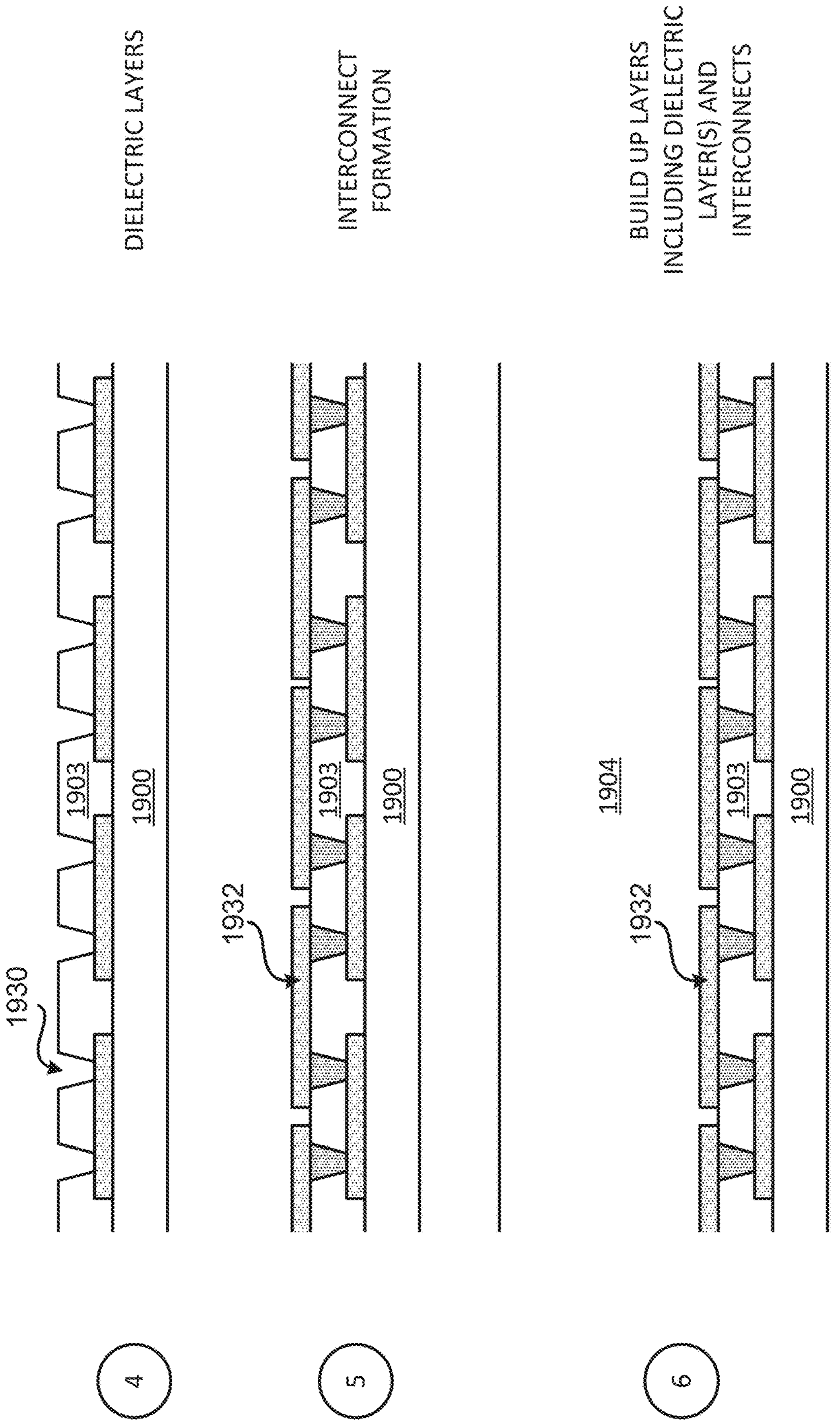

Stage 4, as shown in FIG. 19B, illustrates a state after cavities and/or openings 1930 are formed in the dielectric layer 1903. An exposure, a development and/or an etching process may be used to pattern the dielectric layer 1903, which creates cavities and/or openings 1930 in the dielectric layer 1903.

Stage 5 illustrates a state after a plurality of interconnects 1932 are formed and coupled to a first surface (e.g., top surface) of the dielectric layer 1903. A plating process and a patterning process may be used to form the plurality of interconnects 1932. The plurality of interconnects 1932 may be coupled to the plurality of interconnects 1912.

Stage 6 illustrates a state after at least one build layer 1904 is formed. The at least one build up layer 1904 may include additional dielectric layers and/or additional interconnects. Thus, the at least one build up layer 1904 may include several metal layers. The at least one build up layer 1904 may be formed using the process as shown at stage 3 through stage 5 of FIGS. 19A-19B. In some implementations, Stage 3 through stage 5 of FIG. 19A-19B, may be iteratively repeated with different patterns and/or designs.

Figure 19C:
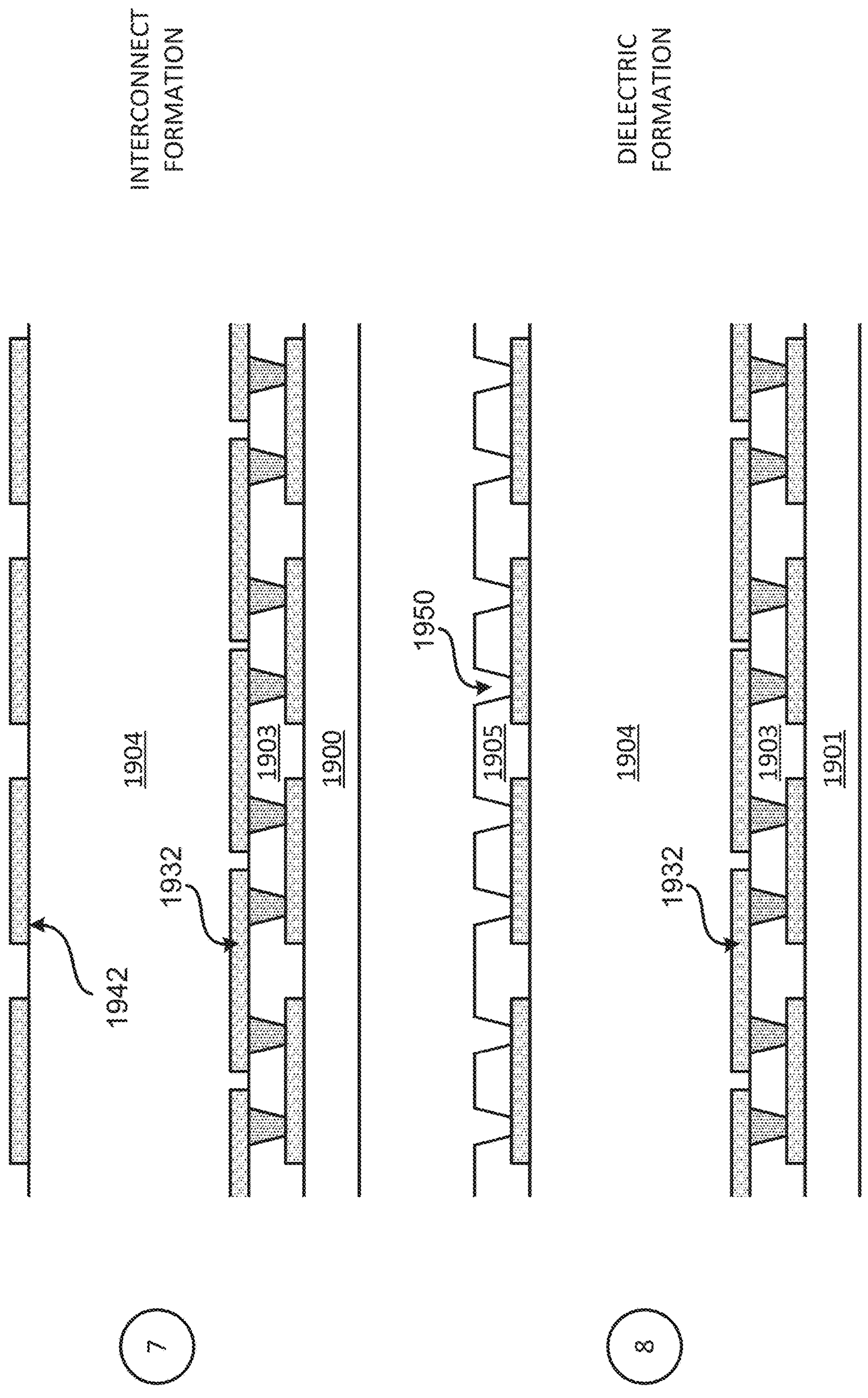

Stage 7, as shown in FIG. 19C, illustrates a state after a plurality of interconnects 1942 are formed over the at least one build up layer 1904. A plating process and a patterning process may be used to form the plurality of interconnects 1942. The plurality of interconnects 1942 may be coupled to interconnects formed during the buildup process shown at stage 6. Thus, the plurality of interconnects 1942 may be coupled to interconnects from the at least one build up layer 1904.

Stage 8 illustrates a state after the dielectric layer 1905 is formed. The dielectric layer 1905 may include a plurality of openings 1950. The dielectric layer 1905 may be formed and coupled to the surface of the at least one build up layer 1904. A deposition, a lamination, an exposure, a development and/or an etching process may be used to form and pattern the dielectric layer 1905, including forming the openings 1950. In some implementations, the dielectric layer 1905 may include a polymer. In some implementations, the dielectric layer 1905 may include Ajinomoto Build-up Film (ABF). In some implementations, the dielectric layer 1905 may include prepreg.

Figure 19D:
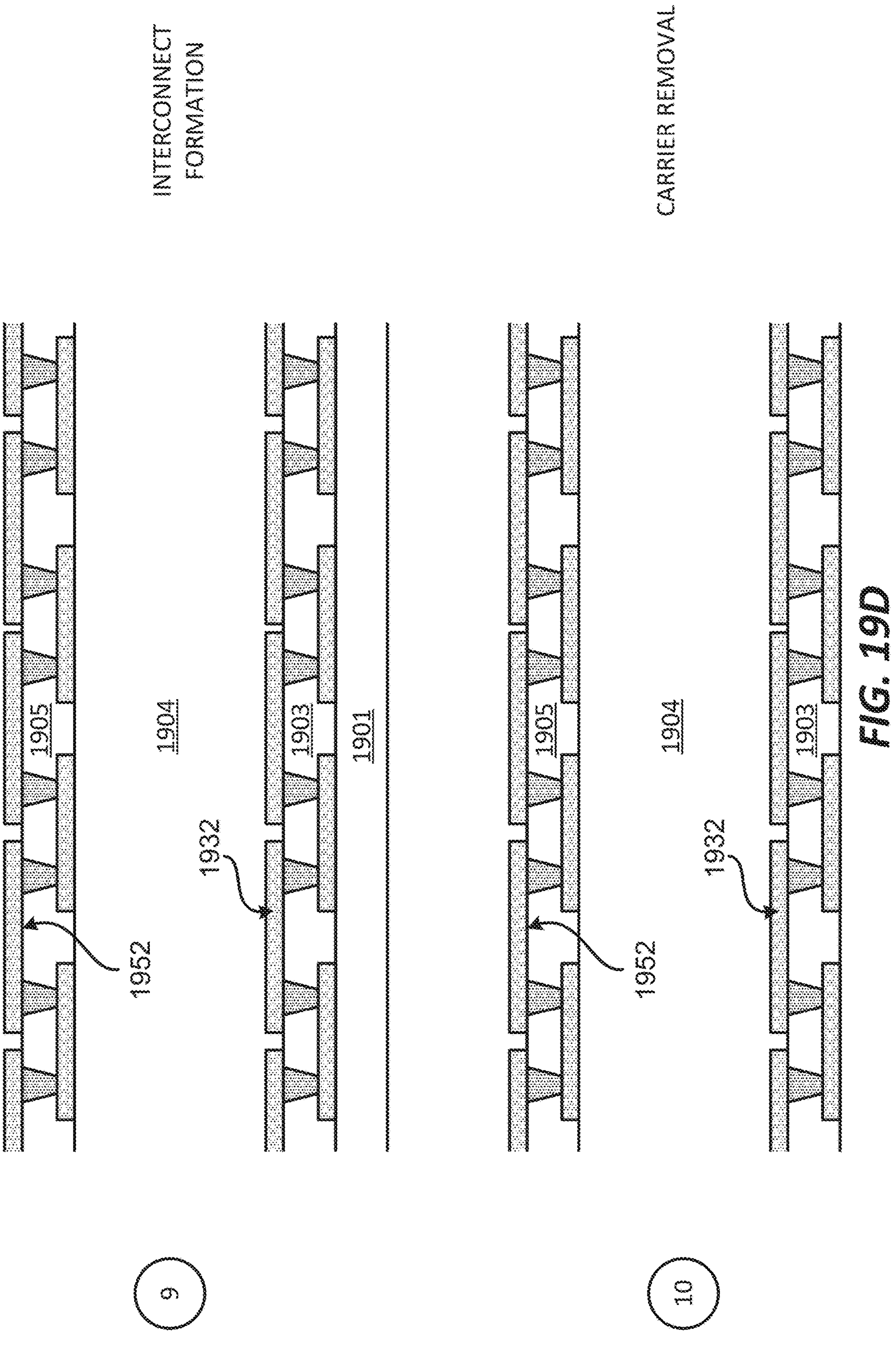

Stage 9, as shown in FIG. 19D, illustrates a state after a plurality of interconnects 1952 are formed and coupled to a first surface (e.g., top surface) of the dielectric layer 1905. A plating process and a patterning process may be used to form the plurality of interconnects 1952. The plurality of interconnects 1952 may be coupled to the plurality of interconnects 1942.

Stage 10 illustrates a state after the carrier 1900 is decoupled and/or detached from the antenna base. The carrier 1900 may be detached from the dielectric layer and/or the interconnects of the antenna base. Stage 10 may illustrate an example of an antenna base 1700 that includes several antennas and a plurality of slot openings.

Figure 19E:
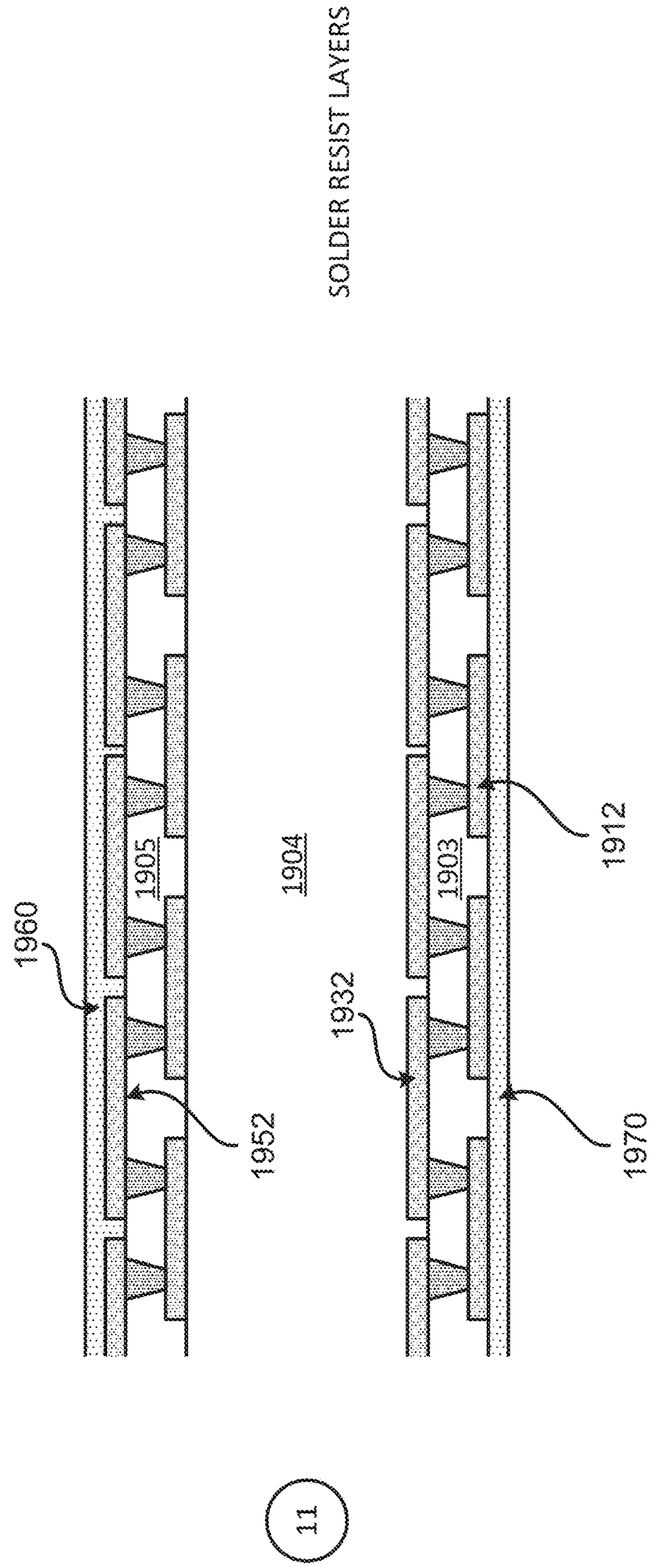

Stage 11, as shown in FIG. 19E, illustrates a state after a solder resist layer 1960 is formed and patterned. The solder resist layer 1960 may be coupled to the plurality of interconnects 1952 and the dielectric layer 1905. A deposition, a lamination, an exposure, a development and/or an etching process may be used to form and pattern the solder resist layer 1960. Stage 6 also illustrates and describes a state after a solder resist layer 1970 is formed and patterned. The solder resist layer 1970 may be coupled to the plurality of interconnects 1912 and the dielectric layer 1903. A deposition, a lamination, an exposure, a development and/or an etching process may be used to form and pattern the solder resist layer 1970.

Stage 11 may illustrate an example of an antenna base 1700 that includes several antennas and a plurality of slot openings. The antenna base 1700 may be singulated into several antenna devices with a slot opening.

Exemplary Flow Diagram of a Method for Fabricating an Antenna Base

Figure 20:
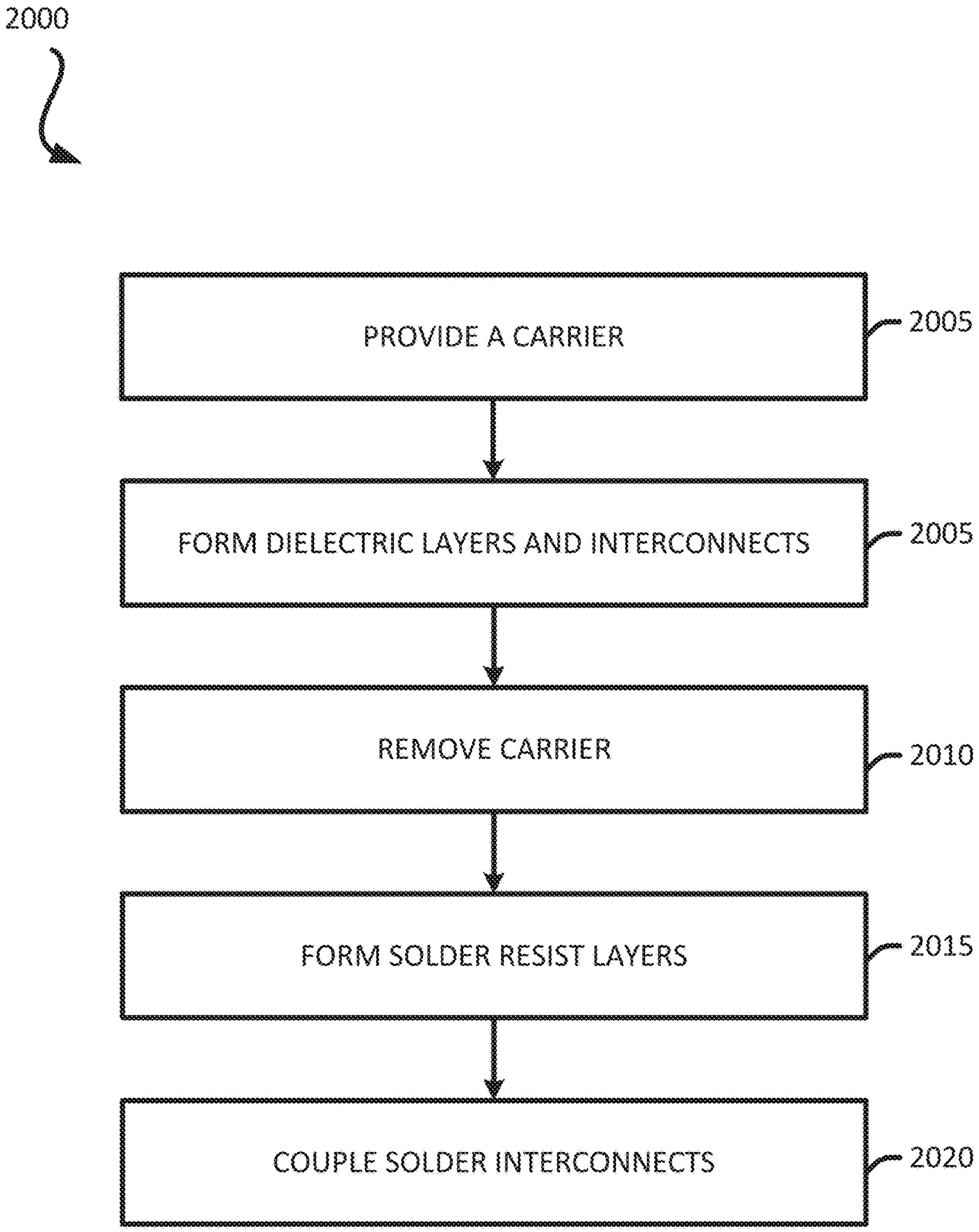
FIG. 20 illustrates an exemplary sequence for fabricating an antenna base.

In some implementations, fabricating a substrate includes several processes. FIG. 20 illustrates an exemplary flow diagram of a method 2000 for providing or fabricating an antenna base. In some implementations, the method 2000 of FIG. 20 may be used to provide or fabricate the antenna base 1700.

It should be noted that the method 2000 of FIG. 20 may combine one or more processes in order to simplify and/or clarify the method for providing or fabricating an antenna base. In some implementations, the order of the processes may be changed or modified.

The method provides (at 2005) a carrier. Stage 1 of FIG. 19A, illustrates and describes an example of a state after a carrier 1900 is provided. Different implementations may provide different types of a carrier. The carrier 1900 may include a core layer. A core layer may include a seed layer.

The method forms (at 2010) interconnects and dielectric layers over the carrier. Stage 2 of FIG. 19A through stage 9 of FIG. 19D, illustrate and describe an example of forming interconnects and dielectric layers.

Stage 2 of FIG. 19A, illustrates and describes an example of a state after a plurality of interconnects 1912 are formed over the carrier 1900. A plating process and a patterning process may be used to form the plurality of interconnects 1912.

Stage 3 of FIG. 19A, illustrates and describes an example of a state after the dielectric layer 1903 is formed. The dielectric layer 1903 may be formed and coupled to the first surface of the carrier 1900. A deposition and/or a lamination to form the dielectric layer 1903. In some implementations, the dielectric layer 1903 may include Ajinomoto Build-up Film (ABF). In some implementations, the dielectric layer 1903 may include prepreg. In some implementations, the dielectric layer 1903 may include a polymer.

Stage 4 of FIG. 19B, illustrates and describes an example of a state after cavities and/or openings 1930 are formed in the dielectric layer 1903. An exposure, a development and/or an etching process may be used to pattern the dielectric layer 1903, which creates cavities and/or openings 1930 in the dielectric layer 1903.

Stage 5 of FIG. 19B, illustrates and describes an example of a state after a plurality of interconnects 1932 are formed and coupled to a first surface (e.g., top surface) of the dielectric layer 1903. A plating process and a patterning process may be used to form the plurality of interconnects 1932. The plurality of interconnects 1932 may be coupled to the plurality of interconnects 1912.

Stage 6 of FIG. 19B, illustrates and describes an example of a state after at least one build layer 1904 is formed. The at least one build up layer 1904 may include additional dielectric layers and/or additional interconnects. The at least one build up layer 1904 may be formed using the process as shown at Stage 3 through stage 5 of FIGS. 19A-19B. In some implementations, Stage 3 through stage 5 may be iteratively repeated with different patterns and/or designs.

Stage 7 of FIG. 19C, illustrates and describes an example of a state after a plurality of interconnects 1942 are formed over the at least one build up layer 1904. A plating process and a patterning process may be used to form the plurality of interconnects 1942. The plurality of interconnects 1942 may be coupled to interconnects formed during the buildup process shown at stage 6.

Stage 8 of FIG. 19C, illustrates and describes an example of a state after the dielectric layer 1905 is formed. The dielectric layer 1905 may include a plurality of openings 1950. The dielectric layer 1905 may be formed and coupled to the surface of the at least one build up layer 1904. A deposition, a lamination, an exposure, a development and/or an etching process may be used to form and pattern the dielectric layer 1905. In some implementations, the dielectric layer 1905 may include a polymer. In some implementations, the dielectric layer 1905 may include Ajinomoto Build-up Film (ABF). In some implementations, the dielectric layer 1905 may include prepreg.

Stage 9 of FIG. 19D, illustrates and describes an example of a state after a plurality of interconnects 1952 are formed and coupled to a first surface (e.g., top surface) of the dielectric layer 1905. A plating process and a patterning process may be used to form the plurality of interconnects 1952. The plurality of interconnects 1952 may be coupled to the plurality of interconnects 1942.

The method removes (at 2010) the carrier. Stage 10 of FIG. 19D, illustrates and describes an example of a state after the carrier 1900 is decoupled and/or detached from the antenna base. The carrier 1900 may be detached from the dielectric layer and/or the interconnects of the antenna base. Stage 10 of FIG. 19D, may illustrate an example of an antenna base 1700 that includes several antennas and a plurality of slot openings.

The method couples (at 2015) solder resist layers. Stage 11 of FIG. 19E, illustrates and describes an example of a state after a solder resist layer 1960 is formed and patterned. The solder resist layer 1960 may be coupled to the plurality of interconnects 1952 and the dielectric layer 1905. A deposition, a lamination, an exposure, a development and/or an etching process may be used to form and pattern the solder resist layer 1960. Stage 6 also illustrates and describes a state after a solder resist layer 1970 is formed and patterned. The solder resist layer 1970 may be coupled to the plurality of interconnects 1912 and the dielectric layer 1903. A deposition, a lamination, an exposure, a development and/or an etching process may be used to form and pattern the solder resist layer 1970. Stage 11 of FIG. 19E may illustrate an example of an antenna base 1700 that includes several antennas and a plurality of slot openings. The antenna base 1700 may be singulated into several antenna devices with a slot opening.

The method couples (at 2020) a plurality of solder interconnects to the antenna base. A solder reflow process may be used to couple the plurality of solder interconnects to the antenna base.

Exemplary Package With a Substrate Comprising Embedded Antenna Devices Comprising a Slot Opening In some implementations, one or more antenna devices with a slot opening may be embedded in a substrate. Thus, instead of being a separate discrete device from a substrate, the antenna device is embedded in the substrate and/or is considered part of the substrate (e.g., part of the package substrate).

Figure 21:
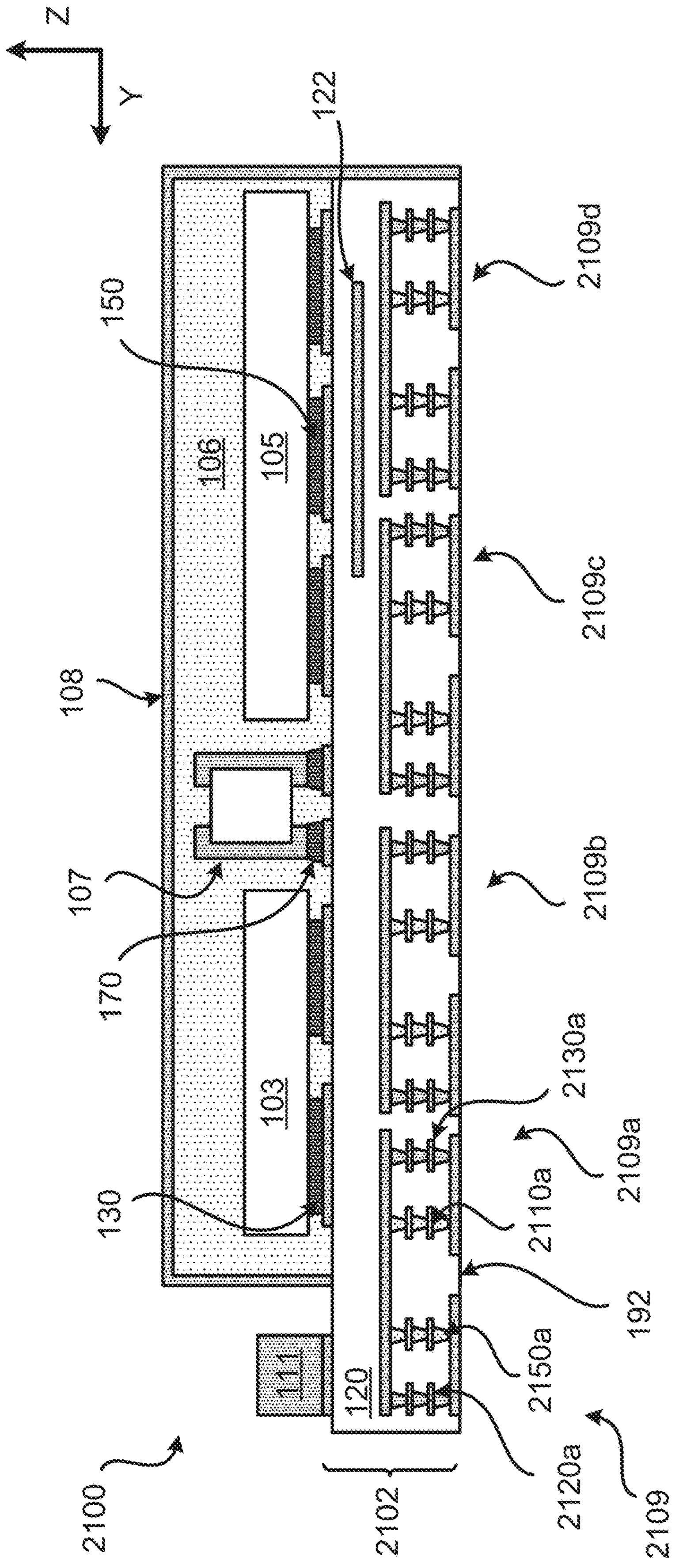
FIG. 21 illustrates an exemplary profile view of an antenna package that includes a substrate with several antenna devices comprising a slot opening.

FIG. 21 illustrates a profile view of a package 2100 that includes a substrate with embedded antenna devices with a slot opening. The package 2100 may be an antenna package. The package 2100 includes a substrate 2102, an integrated device 103, an integrated device 105, a passive device 107, an encapsulation layer 106, a shield 108, a plurality of antenna devices 2109 and a connector 111. One or more antenna devices from the plurality of antenna devices 2109, may include a slot opening. The plurality of antenna devices 2109 are embedded in the substrate 2102. The substrate 2102 includes at least one dielectric layer 120 and a plurality of interconnects 122.

The package 2100 is similar to the package 1300, and is configured to operate in a similar manner as the package 1300. However, as mentioned above, the plurality of antenna devices 2109 are considered part of the substrate 2102, instead of being separate discrete devices from the substrate 2102. The plurality of antenna devices 2109 may be similar to other antenna devices described in the disclosure and may operate in a similar manner.

The plurality of antenna devices 2109 may be embedded antenna devices. The plurality of antenna devices 2109 may be configured to be electrically coupled to interconnects from the plurality of interconnects 122. The plurality of antenna devices 2109 may share the same dielectric layer of the substrate 2102. For example, the antenna dielectric layer of an antenna device may share or be the same as the at least one dielectric layer 120 of the substrate 2102. The plurality of antenna devices 2109 include an antenna device 2109*a*, an antenna device 2109*b*, an antenna device 2109*c* and an antenna device 2109*d*. Each antenna device may include a corresponding slot opening 192. Each antenna device may also include a plurality of stacks of vias (e.g., stacks of vias and pads) that are configured as sidewalls for shielding (e.g., electromagnetic interference (EMI) shielding). For example, the antenna device 2109*a* includes a stacked via wall 2120*a* and a stacked via wall 2130*a*, where each stacked via wall is configured as a shield. The stacked via walls (e.g., 2120*a*, 2130*a*) may shield the antenna device 2109*a* from other nearby antenna devices (e.g., 2109*b*) and/or other components. A stacked via wall may include pads between vias. Thus, a stacked via wall may include interconnects that alternate between vias and pads, that are coupled to each other. A stacked via wall may include a plurality of stacks of vias that are adjacent to each other. For example, a first stack of vias, a second stack of vias and a third stack of vias may be formed and/or located next to each other (e.g., in row arrangement or in column arrangement) to form a stacked via wall. A stacked via wall may include rows and/or columns of stacks of vias that form the equivalent of a wall. The stack of vias of a stacked via wall may be coupled to each other through interconnects. In some implementations, a stack of via may include and/or be replaced with one via that extends through multiple metal layers. The configuration of the package 2100 provides a more compact form factor, which enables the package 2100 to be implemented in smaller devices, while still providing effective antenna transmission and/or reception. In some implementations, the antenna device 200 shown in FIG. 3 (with or without the shield 204), may be a representation of an antenna device from the plurality of antenna devices 2109. For example, the stacked via wall 2120*a* and/or the stacked via wall 2130*a* may be represented by the stacked via wall 305 and/or the stacked via wall 306.

An electrical path between the antenna device 2109*a* and the integrated device 103 may include interconnects from the plurality of interconnects 122, and a solder interconnect from the plurality of solder interconnects 130. An electrical path between the connector 111 and the integrated device 103 may include interconnects from the plurality of interconnects 122, and a solder interconnect from the plurality of solder interconnects 130.

An electrical path between the antenna device 2109*d* and the integrated device 105 may include interconnects from the plurality of interconnects 122, and a solder interconnect from the plurality of solder interconnects 150. An electrical path between the connector 111 and the integrated device 105 may include interconnects from the plurality of interconnects 122, and a solder interconnect from the plurality of solder interconnects 150.

Figure 22:
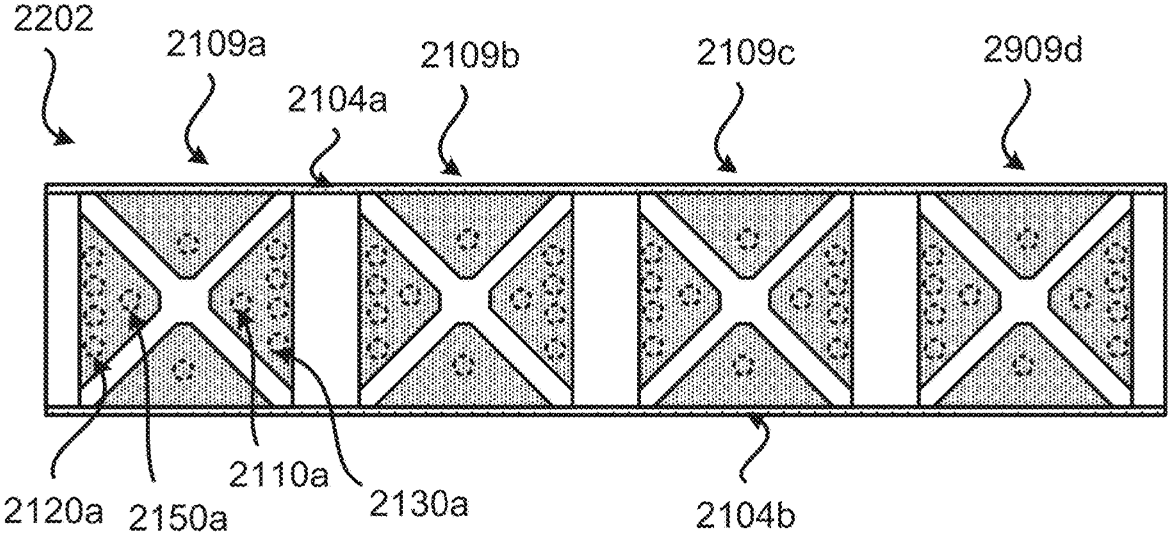
FIG. 22 illustrates an exemplary plan view of an antenna package that includes a substrate with several antenna devices comprising a slot opening.

FIG. 22 illustrates a plan view of the substrate 2202 that includes the plurality of antenna devices 2109. The substrate 2202 may represent a configuration of the substrate 2102 of FIG. 21. FIG. 22 illustrates that the substrate 2202 also includes a shield 2104*a* and a shield 2104*b*. The shield 2104*a* is located and may be coupled to lateral surfaces of the substrate 2102. The shield 2104*b* is located and may be coupled to lateral surfaces of the substrate 2102. The shield 2104*a* may be coupled to lateral surfaces of one or more of the plurality of antenna devices 2109. The shield 2104*a* and/or the shield 2104*b* may be coupled to a bottom surface of the substrate 2102. The shield 2104*a* and/or the shield 2104*b* may be configured as an electromagnetic interference (EMI) shield. The shield 2104*a* and/or the shield 2104*b* may be an antenna shield. The shield 204 may or may not be directly touching the antennas (e.g., 201, 203, 205, 207) from the plurality of antenna devices 2109.

Figure 23:
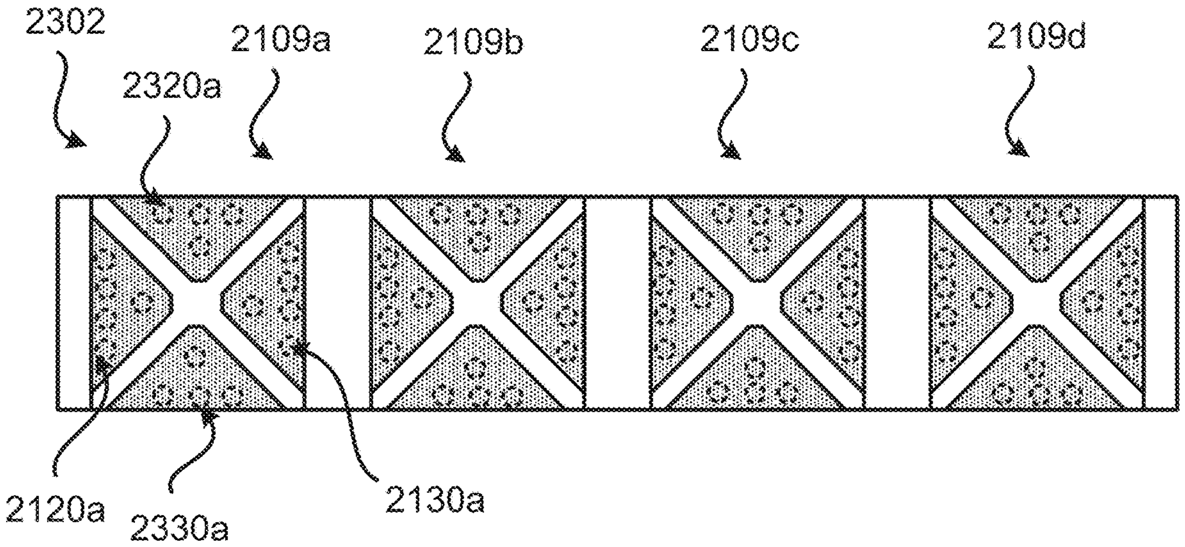
FIG. 23 illustrates an exemplary plan view of an antenna package that includes a substrate with several antenna devices comprising a slot opening.

FIG. 23 illustrates a plan view of the substrate 2302 that includes the plurality of antenna devices 2109. The substrate 2302 may represent a configuration of the substrate 2102 of FIG. 21. FIG. 23 illustrates that the substrate 2302 also includes a plurality of stacked via walls along the periphery of the substrate 2302. For example, the substrate 2302 includes a stacked via wall 2320*a* and a stacked via wall 2330*a*. In some implementations, the stacked via wall 2320*a* and the stacked via wall 2330*a* may be considered part of the antenna device 2109*a*. The stacked via wall 2320*a* and the stacked via wall 2330*a* may be configured to operate in a similar manner as the shield 2104*a* and/or the shield 2104*b*. A stacked via wall may include pads between vias. Thus, a stacked via wall may include interconnects that alternate between vias and pads, that are coupled to each other. In some implementations, a stacked via may include and/or be replaced with one via that extends through multiple metal layers.

Figure 24:
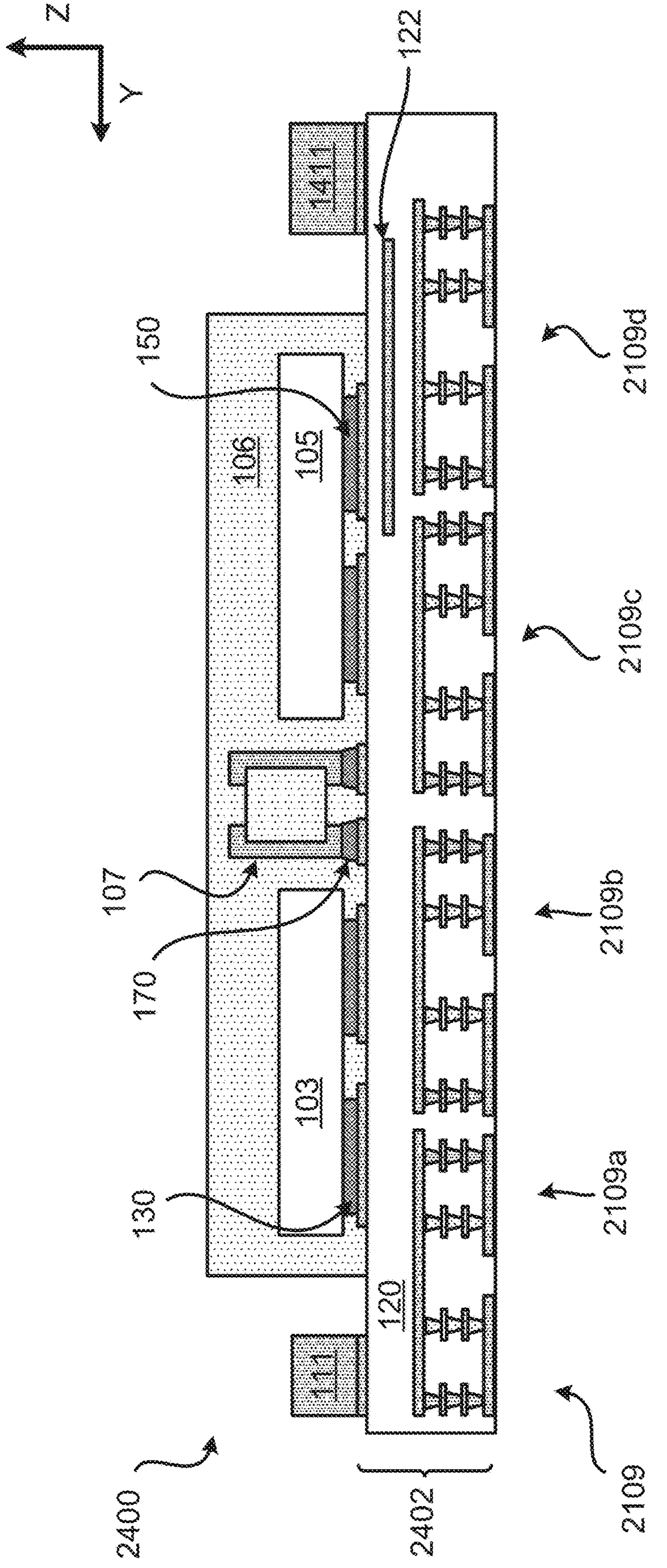
FIG. 24 illustrates an exemplary profile view of an antenna package that includes a substrate with several antenna devices comprising a slot opening.

FIG. 24 illustrates a profile view of a package 2400 that includes a substrate with embedded antenna devices with a slot opening. The package 2400 may be an antenna package. The package 2400 includes a substrate 2402, an integrated device 103, an integrated device 105, a passive device 107, an encapsulation layer 106, a shield 108, a plurality of antenna devices 2109 and a connector 111. One or more antenna devices from the plurality of antenna devices 2109, include a slot opening. The plurality of antenna devices 2109 is embedded in the substrate 2102. The substrate 2402 includes at least one dielectric layer 120 and a plurality of interconnects 122. The substrate 2402 may be similar to the substrate 2102.

The package 2400 is similar to the package 1400, and is configured to operate in a similar manner as the package 1400. However, as mentioned above, the plurality of antenna devices 2109 are considered part of the substrate 2402, instead of being separate discrete devices from the substrate 2402. The plurality of antenna devices 2109 may be similar to other antenna devices described in the disclosure and may operate in a similar manner.

An electrical path between the antenna device 2109*a* and the integrated device 103 of FIG. 24, may include interconnects from the plurality of interconnects 122, and a solder interconnect from the plurality of solder interconnects 130. An electrical path between the connector 111 and the integrated device 103 may include interconnects from the plurality of interconnects 122, and a solder interconnect from the plurality of solder interconnects 130.

An electrical path between the antenna device 2109*d* and the integrated device 105 of FIG. 24, may include interconnects from the plurality of interconnects 122, and a solder interconnect from the plurality of solder interconnects 150. An electrical path between the connector 1411 and the integrated device 105 may include interconnects from the plurality of interconnects 122, and a solder interconnect from the plurality of solder interconnects 150.

Figure 25:
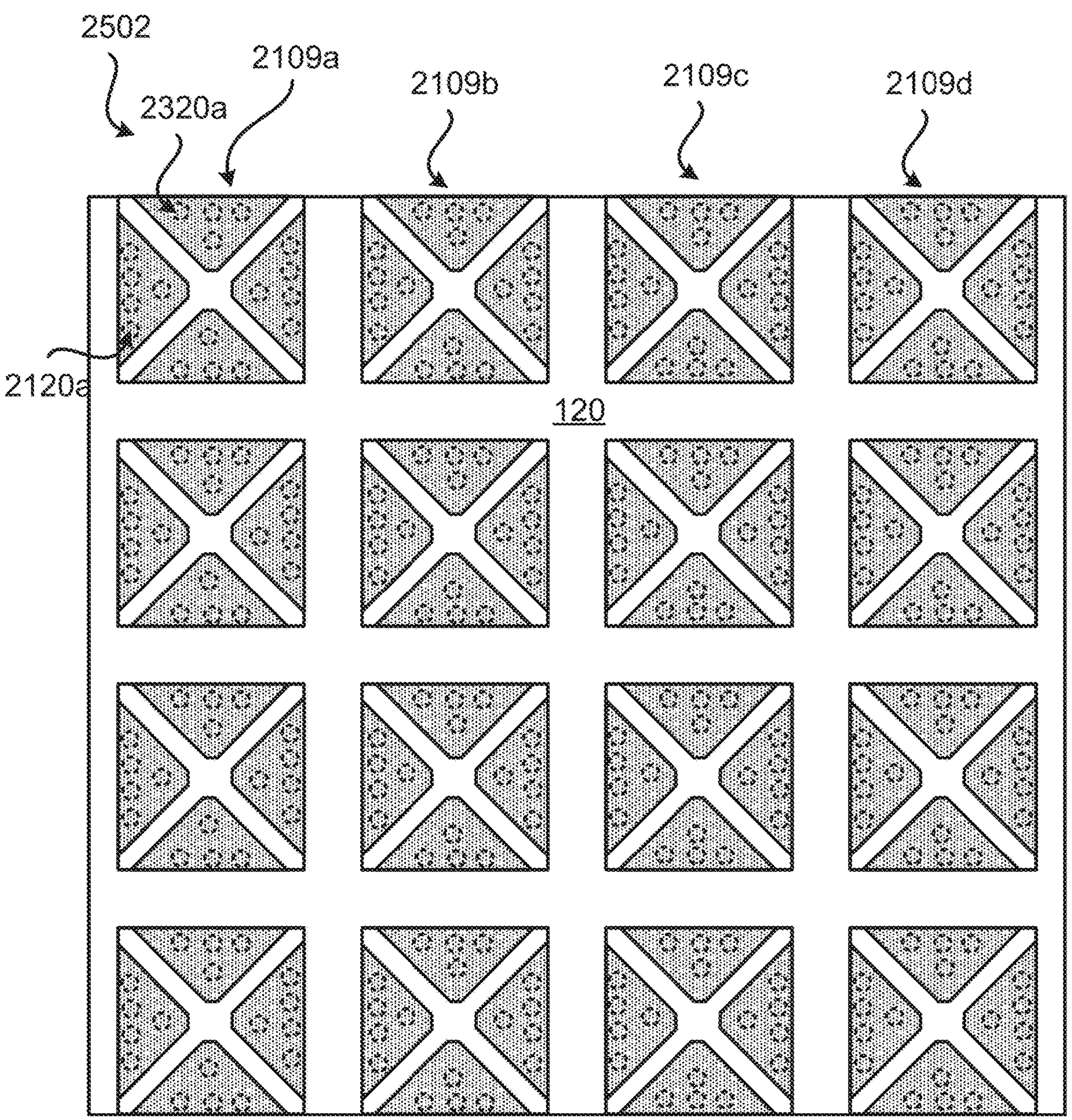
FIG. 25 illustrates an exemplary plan view of an antenna package that includes a substrate with several antenna devices comprising a slot opening.

FIG. 25 illustrates a plan view of the substrate 2502 that includes the plurality of antenna devices 2109. The substrate 2502 may represent a configuration of the substrate 2402 of FIG. 24. FIG. 25 illustrates that the substrate 2502 also includes a plurality of stacked via wall along the periphery of the substrate 2502. For example, the substrate 2502 includes a stacked via wall 2320*a* and a stacked via wall 2120*a*. In some implementations, the stacked via wall 2320*a* and the stacked via wall 2120*a* may be considered part of the antenna device 2109*a*. The stacked via wall 2320*a* and the stacked via wall 2120*a* may be configured to operate in a similar manner as a shield. FIG. 25 illustrates that each embedded antenna device includes stacked via walls along four sides of the embedded antenna device. A stacked via wall may include pads between vias. Thus, a stacked via wall may include interconnects that alternate between vias and pads, that are coupled to each other. In some implementations, a stacked via may include and/or be replaced with one via that extends through multiple metal layers.

Figure 26:
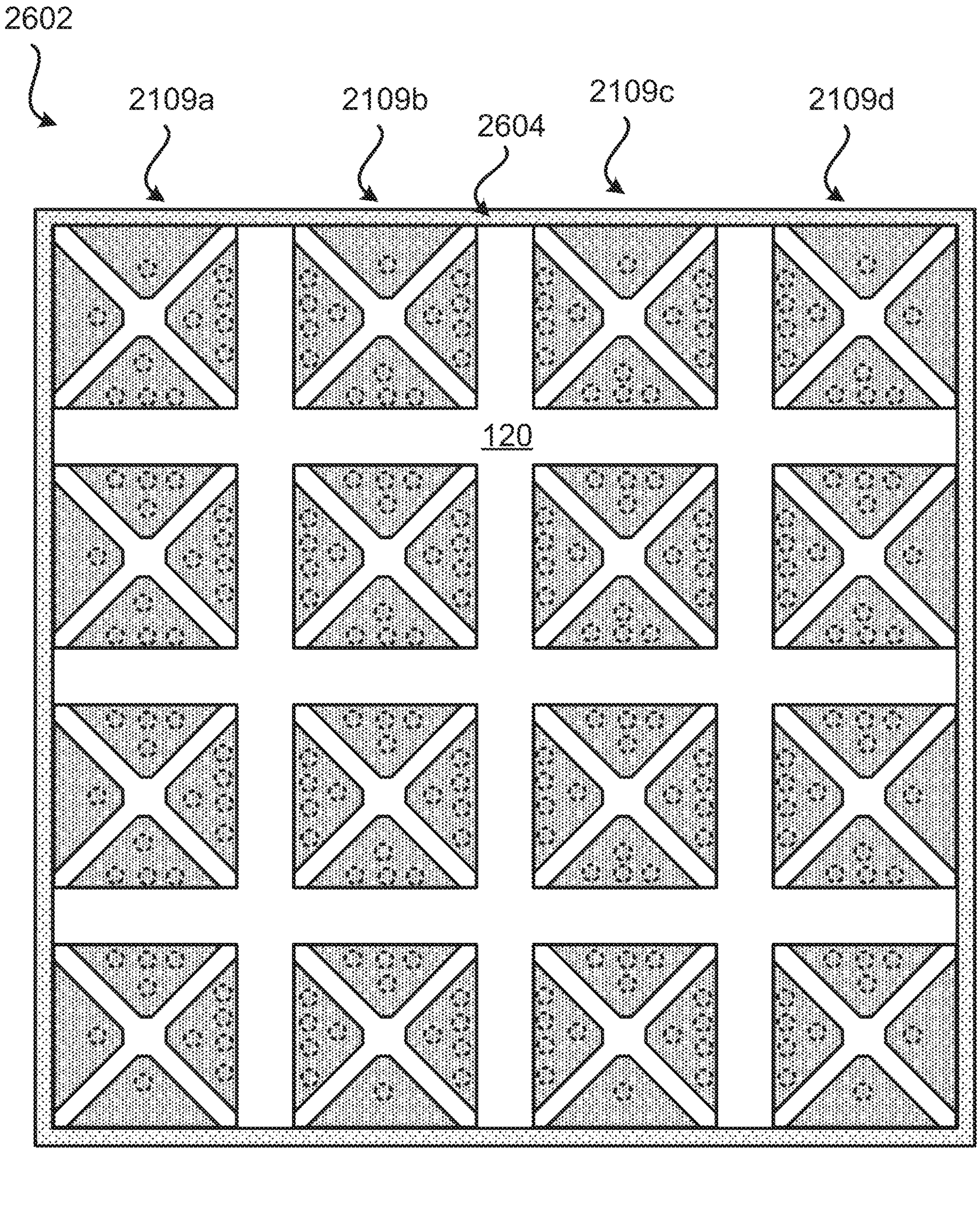
FIG. 26 illustrates an exemplary plan view of an antenna package that includes a substrate with several antenna devices comprising a slot opening.

FIG. 26 illustrates a plan view of the substrate 2602 that includes the plurality of antenna devices 2109. The substrate 2602 may represent a configuration of the substrate 2402 of FIG. 24. FIG. 26 illustrates that the substrate 2602 also includes a shield 2604. The shield 2604 is located and may be coupled to lateral surfaces of the substrate 2602. The shield 2604 may be coupled to lateral surfaces of one or more of the plurality of antenna devices 2109. The shield 2604 may be coupled to a bottom surface of the substrate 2402. The shield 2604 may be configured as an electromagnetic interference (EMI) shield. The shield 2604 may be an antenna shield. The shield 204 may not be directly touching the antennas (e.g., 201, 203, 205, 207) from the plurality of antenna devices 2109.

The substrate 2102, the substrate 2202, the substrate 2302, the substrate 2402, the substrate 2502, and/or the substrate 2602 may be fabricated using the sequence and/or method described in at least FIGS. 19A-19E and/or FIGS. 17A-17B. For example, instead of singulating the substrate into individual antenna devices, the substrate may be fabricated with the embedded antenna devices. Moreover, additional build layers (e.g., additional dielectric layers and/or interconnects may be fabricated to provide routing and for electrical paths to/from integrated devices coupled to the substrate with the embedded antenna devices.

In some implementations, the plurality of antenna devices 2109, as described in at least FIGS. 21-26, may be implemented in the substrate 1620 and/or the substrate 1640 of FIG. 16, in a similar manner. In some implementations, the package device 1600 may include a plurality of antenna devices (e.g., 109, 1609) and/or a plurality of antenna devices 2109. Thus, in some implementations, the package device 1600 may include antenna devices that are embedded in a substrate (e.g., 1620, 1640) and/or discrete antenna devices that are coupled to surface of the substrate (e.g., 1620, 1640).

Exemplary Electronic Devices

Figure 27:
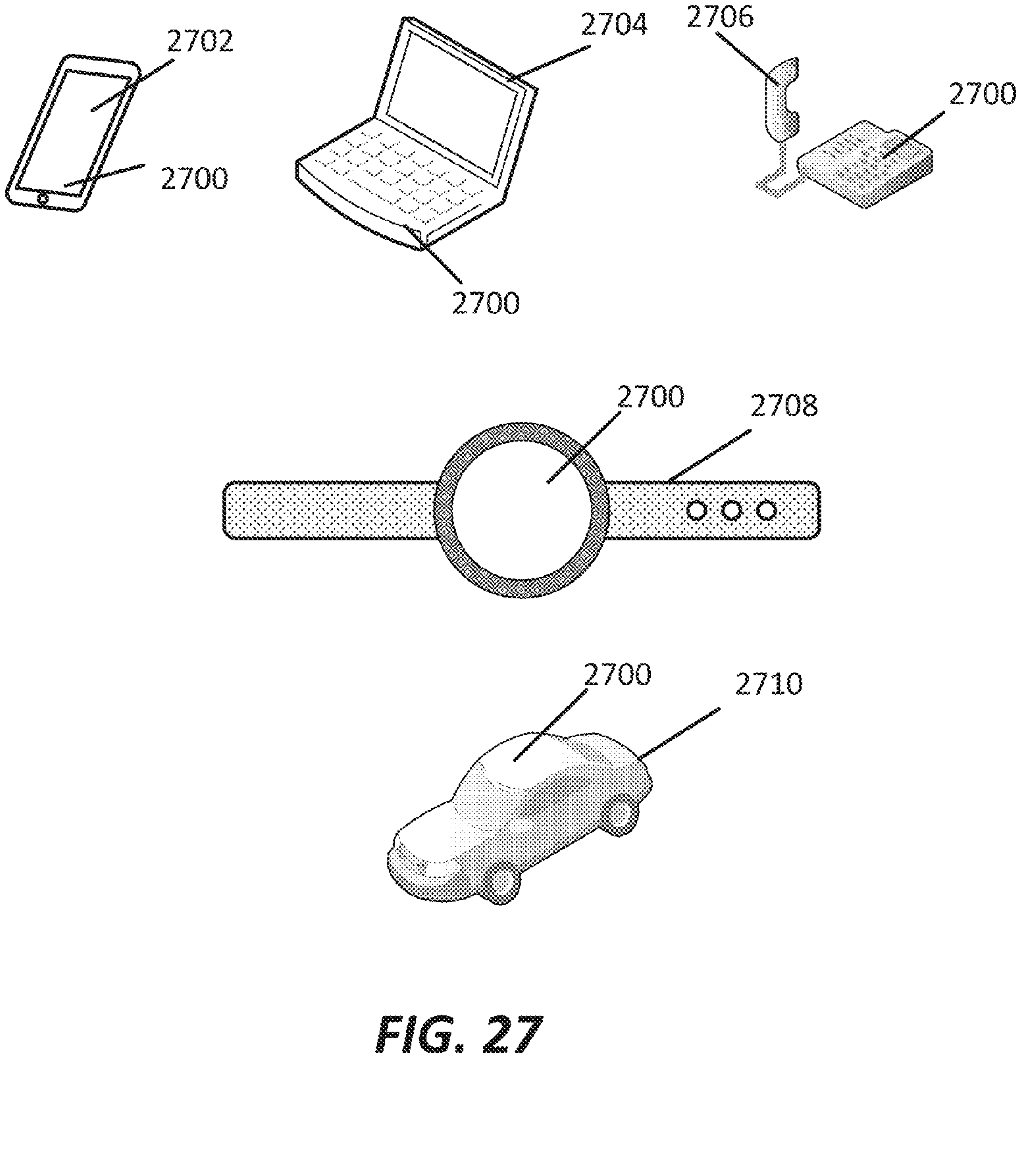
FIG. 27 illustrates various electronic devices that may integrate a die, an electronic circuit, an integrated device, an integrated passive device (IPD), a passive component, a package, and/or a device package described herein.

FIG. 27 illustrates various electronic devices that may be integrated with any of the aforementioned device, integrated device, integrated circuit (IC) package, integrated circuit (IC) device, semiconductor device, integrated circuit, die, interposer, package, package-on-package (PoP), System in Package (SiP), or System on Chip (SoC). For example, a mobile phone device 2702, a laptop computer device 2704, a fixed location terminal device 2706, a wearable device 2708, or automotive vehicle 2710 may include a device 2700 as described herein. The device 2700 may be, for example, any of the devices and/or integrated circuit (IC) packages described herein. The devices 2702, 2704, 2706 and 2708 and the vehicle 2710 illustrated in FIG. 27 are merely exemplary. Other electronic devices may also feature the device 2700 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices (e.g., watches, glasses), Internet of things (IoT) devices, servers, routers, electronic devices implemented in automotive vehicles (e.g., autonomous vehicles), or any other device that stores or retrieves data or computer instructions, or any combination thereof.

One or more of the components, processes, features, and/or functions illustrated in FIGS. 1-16, 17A-17B, 18, 19A-19E, and/or 20-27 may be rearranged and/or combined into a single component, process, feature or function or embodied in several components, processes, or functions. Additional elements, components, processes, and/or functions may also be added without departing from the disclosure. It should also be noted FIGS. 1-16, 17A-17B, 18, 19A-19E, and/or 20-27 and its corresponding description in the present disclosure is not limited to dies and/or ICs. In some implementations, FIGS. 1-16, 17A-17B, 18, 19A-19E, and/or 20-27 and its corresponding description may be used to manufacture, create, provide, and/or produce devices and/or integrated devices. In some implementations, a device may include a die, an integrated device, an integrated passive device (IPD), a die package, an integrated circuit (IC) device, a device package, an integrated circuit (IC) package, a wafer, a semiconductor device, a package-on-package (POP) device, a heat dissipating device and/or an interposer.

It is noted that the figures in the disclosure may represent actual representations and/or conceptual representations of various parts, components, objects, devices, packages, integrated devices, integrated circuits, and/or transistors. In some instances, the figures may not be to scale. In some instances, for purpose of clarity, not all components and/or parts may be shown. In some instances, the position, the location, the sizes, and/or the shapes of various parts and/or components in the figures may be exemplary. In some implementations, various components and/or parts in the figures may be optional.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling (e.g., mechanical coupling) between two objects. For example, if object A physically touches object B, and object B touches object C, then objects A and C may still be considered coupled to one another-even if they do not directly physically touch each other. The term "electrically coupled" may mean that two objects are directly or indirectly coupled together such that an electrical current (e.g., signal, power, ground) may travel between the two objects. Two objects that are electrically coupled may or may not have an electrical current traveling between the two objects. The use of the terms "first", "second", "third" and "fourth" (and/or anything above fourth) is arbitrary. Any of the components described may be the first component, the second component, the third component or the fourth component. For example, a component that is referred to a second component, may be the first component, the second component, the third component or the fourth component. The term "encapsulating" means that the object may partially encapsulate or completely encapsulate another object. A first component that is "located" in a second component may mean that the first component is "partially located" in the second component or "completely located" in the second component. A first component that is "embedded" in a second component may mean that the first component is "partially embedded" in the second component or "completely embedded" in the second component. The terms "top" and "bottom" are arbitrary. A component that is located on top may be located over a component that is located on a bottom. A top component may be considered a bottom component, and vice versa. As described in the disclosure, a first component that is located "over" a second component may mean that the first component is located above or below the second component, depending on how a bottom or top is arbitrarily defined. In another example, a first component may be located over (e.g., above) a first surface of the second component, and a third component may be located over (e.g., below) a second surface of the second component, where the second surface is opposite to the first surface. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, and/or (3) the first component is in (e.g., embedded in) the second component. A first component that is located "in" a second component may be partially located in the second component or completely located in the second component. The term "about 'value X'", or "approximately value X", as used in the disclosure means within 10 percent of the 'value X'. For example, a value of about 1 or approximately 1, would mean a value in a range of 0.9-1.1.

In some implementations, an interconnect is an element or component of a device or package that allows or facilitates an electrical connection between two points, elements and/or components. In some implementations, an interconnect may include a trace, a via, a pad, a pillar, a metallization layer, a redistribution layer, and/or an under bump metallization (UBM) layer/interconnect. In some implementations, an interconnect may include an electrically conductive material that may be configured to provide an electrical path for a signal (e.g., a data signal), ground and/or power. An interconnect may include more than one element or component. An interconnect may be defined by one or more interconnects. An interconnect may include one or more metal layers. An interconnect may be part of a circuit. Different implementations may use different processes and/or sequences for forming the interconnects. In some implementations, a chemical vapor deposition (CVD) process, a physical vapor deposition (PVD) process, a sputtering process, a spray coating, and/or a plating process may be used to form the interconnects.

Also, it is noted that various disclosures contained herein may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed.

In the following, further examples are described to facilitate the understanding of the disclosure.

Aspect 1: An antenna device comprising an antenna device dielectric layer; at least one antenna located on a first surface of the antenna device dielectric layer; a shield located on at least one lateral surface of the antenna device; and a slot opening on the first surface of the antenna device.

Aspect 2: The antenna device of aspect 1, wherein the slot opening is defined by at least a portion of the first surface of the antenna device dielectric layer that is not covered by the at least one antenna.

Aspect 3: The antenna device of aspects 1 through 2, wherein the shield is configured as an electromagnetic interference (EMI) shield.

Aspect 4: The antenna device of aspect 1 through 3, wherein the at least one antenna includes a first antenna, a second antenna, and a third antenna.

Aspect 5: The antenna device of aspect 4, wherein the first antenna has a first triangular planar shape, wherein the second antenna has a second triangular planar shape, and wherein the third antenna has a third triangular planar shape.

Aspect 6: The antenna device of aspects 4 through 5, wherein the slot opening is located between the first antenna, the second antenna and the third antenna.

Aspect 7: The antenna device of aspects 1 through 6, further comprising a plurality of interconnects coupled to the shield.

Aspect 8: The antenna device of aspect 7, wherein the plurality of interconnects include a first plurality of interconnects located on at least two metal layers of the antenna device.

Aspect 9: The antenna device of aspects 1 through 8, wherein the at least one antenna includes at least a portion of a metal layer located on a surface of the antenna device dielectric layer.

Aspect 10: The antenna device of aspects 1 through 9, further comprising a solder resist layer that is coupled to the at least one antenna and covers the slot opening.

Aspect 11: A package comprising a substrate; an integrated device coupled to a first surface of the substrate through at least a first plurality of solder interconnects; and an antenna device coupled to a second surface of the substrate through at least a second plurality of solder interconnects. The antenna device comprises an antenna device dielectric layer; at least one antenna located on a first surface of the antenna device dielectric layer; a shield located on at least one lateral surface of the antenna device; and a slot opening on the first surface of the antenna device.

Aspect 12: The package of aspect 11, wherein the slot opening is defined by at least a portion of the first surface of the antenna device dielectric layer that is not covered by the at least one antenna.

Aspect 13: The package of aspects 11 through 12, wherein the shield is configured as an electromagnetic interference (EMI) shield.

Aspect 14: The package of aspects 11 through 13, wherein the at least one antenna includes a first antenna, a second antenna, and a third antenna.

Aspect 15: The package of aspect 14, wherein the first antenna has a first triangular planar shape, wherein the second antenna has a second triangular planar shape, and wherein the third antenna has a third triangular planar shape.

Aspect 16: The package of aspects 14 through 15, wherein the slot opening is located between the first antenna, the second antenna and the third antenna.

Aspect 17: The package of aspects 11 through 16, further comprising a plurality of interconnects coupled to the shield.

Aspect 18: The package of aspects 11 through 17, further comprising a solder resist layer that is coupled to the at least one antenna and covers the slot opening, wherein the at least one antenna includes at least a portion of a metal layer located on a surface of the antenna device dielectric layer.

Aspect 19: The package of aspects 11 through 18, further comprising a flexible connection coupled to the substrate, a second substrate coupled to the flexible connection, and a second antenna device coupled to a surface of the second substrate.

Aspect 20: The package of aspects 11 through 18, further comprising a flexible connection coupled to the substrate; and a second substrate coupled to the flexible connection, wherein the second substrate includes an embedded antenna device.

Aspect 21: A substrate comprising at least one dielectric layer; a plurality of interconnects; a first antenna device located at least partially in the at least one dielectric layer; and a second antenna device located at least partially in the at least one dielectric layer. The first antenna device comprises a first antenna device dielectric layer; at least one first antenna located on a first surface of the first antenna device dielectric layer; and a first slot opening on the first surface of the first antenna device. The second antenna device comprises a second antenna device dielectric layer; at least one second antenna located on a first surface of the second antenna device dielectric layer; and a second slot opening on the first surface of the second antenna device.

Aspect 22: The substrate of aspect 21, wherein the first slot opening is defined by at least a portion of the first surface of the first antenna device dielectric layer that is not covered by the at least one first antenna.

Aspect 23: The substrate of aspects 21 through 22, wherein the first antenna device dielectric layer and the second antenna device dielectric layer are part of the at least one dielectric layer of the substrate.

Aspect 24: The substrate of aspects 21 through 23, further comprising a metal portion coupled to a lateral surface of the substrate, wherein the metal portion is configured as an electromagnetic interference (EMI) shield for the first antenna device and/or the second antenna device.

Aspect 25: The substrate of aspects 21 through 24, wherein the first antenna device further comprises a first stacked via wall, and wherein the second antenna device further comprises a second stacked via wall.

Aspect 26: The substrate of aspects 21 through 25, wherein at least one first antenna includes a first antenna, a second antenna, and a third antenna.

Aspect 27: The substrate of aspect 26, wherein the first antenna has a first triangular planar shape, wherein the second antenna has a second triangular planar shape, and wherein the third antenna has a third triangular planar shape.

Aspect 28: The substrate of aspects 26 through 27, wherein the slot opening is located between the first antenna, the second antenna and the third antenna.

Aspect 29: A package comprising an integrated device; and a first substrate coupled to the integrated device through at least a first plurality of solder interconnects. The first substrate comprises at least one dielectric layer; a plurality of interconnects; a first antenna device located at least partially in the at least one dielectric layer, and a second antenna device located at least partially in the at least one dielectric layer. The first antenna device comprises a first antenna device dielectric layer; at least one first antenna located on a first surface of the first antenna device dielectric layer; and a first slot opening on the first surface of the first antenna device. The second antenna device comprises a second antenna device dielectric layer; at least one second antenna located on a first surface of the second antenna device dielectric layer; and a second slot opening on the first surface of the second antenna device.

Aspect 30. The package of claim 29, further comprising a flexible connection coupled to the first substrate; and a second substrate coupled to the flexible connection, wherein the second substrate includes an embedded antenna device.

The various features of the disclosure described herein can be implemented in different systems without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

The invention claimed is:

1. An antenna device comprising:
an antenna device dielectric layer;
at least one antenna located on a first surface of the antenna device dielectric layer;
a shield located on at least one lateral surface of the antenna device;
a slot opening on a first surface of the antenna device; and
a plurality of interconnects coupled to the shield.

2. The antenna device of claim 1, wherein the slot opening is defined by at least a portion of the first surface of the antenna device dielectric layer that is not covered by the at least one antenna.

3. The antenna device of claim 1, wherein the shield is configured as an electromagnetic interference (EMI) shield.

4. The antenna device of claim 1, wherein the at least one antenna includes a first antenna, a second antenna, and a third antenna.

5. The antenna device of claim 4,
wherein the first antenna has a first triangular planar shape,
wherein the second antenna has a second triangular planar shape, and
wherein the third antenna has a third triangular planar shape.

6. The antenna device of claim 4, wherein the slot opening is located between the first antenna, the second antenna and the third antenna.

7. The antenna device of claim 1, wherein the first surface of the antenna device includes the first surface of the antenna device dielectric layer.

8. The antenna device of claim 1, wherein the plurality of interconnects include a first plurality of interconnects located on at least two metal layers of the antenna device.

9. The antenna device of claim 1, wherein the at least one antenna includes at least a portion of a metal layer located on a surface of the antenna device dielectric layer.

10. The antenna device of claim 1, further comprising a solder resist layer that is coupled to the at least one antenna and covers the slot opening.

11. A package comprising:
a substrate;
an integrated device coupled to a first surface of the substrate through at least a first plurality of solder interconnects; and
an antenna device coupled to a second surface of the substrate through at least a second plurality of solder interconnects, wherein the antenna device comprises:
an antenna device dielectric layer;
at least one antenna located on a first surface of the antenna device dielectric layer;
a shield located on at least one lateral surface of the antenna device; and
a slot opening on a first surface of the antenna device.

12. The package of claim 11, wherein the slot opening is defined by at least a portion of the first surface of the antenna device dielectric layer that is not covered by the at least one antenna.

13. The package of claim 11, wherein the shield is configured as an electromagnetic interference (EMI) shield.

14. The package of claim 11, wherein the at least one antenna includes a first antenna, a second antenna, and a third antenna.

15. The package of claim 14, wherein the first antenna has a first triangular planar shape, wherein the second antenna has a second triangular planar shape, and wherein the third antenna has a third triangular planar shape.

16. The package of claim 14, wherein the slot opening is located between the first antenna, the second antenna and the third antenna.

17. The package of claim 11, further comprising a plurality of interconnects coupled to the shield.

18. The package of claim 11, further comprising a solder resist layer that is coupled to the at least one antenna and covers the slot opening, wherein the at least one antenna includes at least a portion of a metal layer located on a surface of the antenna device dielectric layer.

19. The package of claim 11, further comprising:

a flexible connection coupled to the substrate;

a second substrate coupled to the flexible connection; and a second antenna device coupled to a surface of the second substrate.

20. The package of claim 11, further comprising:

a flexible connection coupled to the substrate; and a second substrate coupled to the flexible connection, wherein the second substrate includes an embedded antenna device.

21. A substrate comprising:

at least one dielectric layer;

a plurality of interconnects;

a first antenna device located at least partially in the at least one dielectric layer, wherein the first antenna device comprises:

a first antenna device dielectric layer;

at least one first antenna located on a first surface of the first antenna device dielectric layer; and a first slot opening on a first surface of the first antenna device, and a second antenna device located at least partially in the at least one dielectric layer, wherein the second antenna device comprises:

a second antenna device dielectric layer;

at least one second antenna located on a first surface of the second antenna device dielectric layer; and a second slot opening on a first surface of the second antenna device.

22. The substrate of claim 21, wherein the first slot opening is defined by at least a portion of the first surface of the first antenna device dielectric layer that is not covered by the at least one first antenna.

23. The substrate of claim 21, wherein the first antenna device dielectric layer and the second antenna device dielectric layer are part of the at least one dielectric layer of the substrate.

24. The substrate of claim 21, further comprising a metal portion coupled to a lateral surface of the substrate, wherein the metal portion is configured as an electromagnetic interference (EMI) shield for the first antenna device and/or the second antenna device.

25. The substrate of claim 21, wherein the first antenna device further comprises a first stacked via wall, and wherein the second antenna device further comprises a second stacked via wall.

26. The substrate of claim 21, wherein at least one first antenna includes a first antenna, a second antenna, and a third antenna.

27. The substrate of claim 26, wherein the first antenna has a first triangular planar shape, wherein the second antenna has a second triangular planar shape, and wherein the third antenna has a third triangular planar shape.

28. The substrate of claim 26, wherein the first slot opening is located between the first antenna, the second antenna and the third antenna.

29. A package comprising:

an integrated device; and a first substrate coupled to the integrated device through at least a first plurality of solder interconnects, wherein the first substrate comprises:

at least one dielectric layer;

a plurality of interconnects;

a first antenna device located at least partially in the at least one dielectric layer, wherein the first antenna device comprises:

a first antenna device dielectric layer;

at least one first antenna located on a first surface of the first antenna device dielectric layer; and a first slot opening on a first surface of the first antenna device, and a second antenna device located at least partially in the at least one dielectric layer, wherein the second antenna device comprises:

a second antenna device dielectric layer;

at least one second antenna located on a first surface of the second antenna device dielectric layer; and a second slot opening on a first surface of the second antenna device.

30. The package of claim 29, further comprising:

a flexible connection coupled to the first substrate; and a second substrate coupled to the flexible connection, wherein the second substrate includes an embedded antenna device.

* * * * *